United States Patent [19]
Wasserman et al.

[11] Patent Number: 5,781,184
[45] Date of Patent: Jul. 14, 1998

[54] REAL TIME DECOMPRESSION AND POST-DECOMPRESS MANIPULATION OF COMPRESSED FULL MOTION VIDEO

[76] Inventors: Steve C. Wasserman, 10455 N. Blaney Ave., Cupertino, Calif. 95014; Gregory G. Williams, 552 Everett Ave., #5, Palo Alto, Calif. 94301; Timothy P. Bucher, 744 Peach Ave., Sunnyvale, Calif. 94087; Curtis Pansegrau, 297 Leslie Ct., #1, Mountain View, Calif. 94043; Philippe M. Cassareau, 945 Shoreline Dr., San Mateo, Calif. 94404; Gregory K. Wallace, 3121 Cowper St., Palo Alto, Calif. 94306

[21] Appl. No.: 311,192

[22] Filed: Sep. 23, 1994

[51] Int. Cl.⁶ .................................................. G09G 5/00
[52] U.S. Cl. ............................................... 345/202; 348/441
[58] Field of Search ............................. 348/441, 443; 382/166, 232, 233; 345/202

[56] References Cited

U.S. PATENT DOCUMENTS

| | | |
|---|---|---|
| 4,965,845 | 10/1990 | Chan et al. ............................ 382/166 |
| 4,970,663 | 11/1990 | Bedell et al. .......................... 364/521 |
| 5,122,873 | 6/1992 | Golin ................................... 358/133 |
| 5,164,839 | 11/1992 | Lang .................................... 358/335 |
| 5,172,237 | 12/1992 | Blonstein et al. ................ 382/166 X |
| 5,283,819 | 2/1994 | Glick et al. ............................ 379/90 |

*Primary Examiner*—Ulysses Weldon
*Attorney, Agent, or Firm*—Fliesler, Dubb, Meyer & Lovejoy

[57] ABSTRACT

A method and apparatus are provided for real time decompression and post-decompress manipulation of compressed full motion video. A decompressed play-back signal is supplied to a real-time video processing system by way of an adaptor for post-decompress manipulation. The post-decompress manipulations include real-time, interactive geometry transformations and color re-mappings. The adaptor includes a range expansion module for eliminating dead space such as found in CCIR-601 outputs. The adaptor further includes a resampling module for programmably converting the pixels-per-line format of the decompressed play-back signal. The adaptor additionally includes a clip-and-dither module for altering the bits-per-pixel format of the adaptor output signal and for applying a programmably-defined dither to the adaptor output signal.

73 Claims, 7 Drawing Sheets

REAL TIME DECOMPRESSION AND POST-DECOMPRESS MANIPULATION OF COMPRESSED FULL MOTION VIDEO

BACKGROUND

1. Field of the Invention

The invention relates generally to the field of digital data compression and decompression. The invention relates more specifically to post-decompression, high-speed, digital manipulation of full motion video (FMV) signals.

2a. Cross Reference to Related Applications

The following copending U.S. patent applications are assigned to the assignee of the present application, are related to the present application and their disclosures are respectively incorporated herein by reference:

(A) PCT Patent Application Ser. No. PCT/US92/09349, entitled AUDIO/VIDEO COMPUTER ARCHITECTURE, by inventors R. J. Mical et al., filed Nov. 2, 1992, |Attorney Docket No. MDIO42221| and also corresponding U.S. patent application Ser. No. 07/970,308, bearing the same title, same inventors and also filed Nov. 2, 1992;

(B) PCT Patent Application Ser. No. PCT/US92/09350, entitled METHOD FOR CONTROLLING A SPRYTE RENDERING PROCESSOR, by inventors R. J. Mical et al., filed Nov. 2, 1992, |Attorney Docket No. MDIO3040| and also corresponding U.S. patent application Ser. No. 07/970,278, bearing the same title, same inventors and also filed Nov. 2, 1992;

(C) PCT Patent Application Ser. No. PCT/US92/09467, entitled IMPROVED METHOD AND APPARATUS FOR PROCESSING IMAGE DATA, by inventors R. J. Mical et al., filed Nov. 2, 1992, |Attorney Docket No. MDIO4230| and also corresponding U.S. patent application Ser. No. 07/970,083, bearing the same title, same inventors and also filed Nov. 2, 1992;

(D) PCT Patent Application Ser. No. PCT/US92/09462, entitled SPRYTE RENDERING SYSTEM WITH IMPROVED CORNER CALCULATING ENGINE AND IMPROVED POLYGON-PAINT ENGINE, by inventors David L. Needle et al., filed Nov. 2, 1992, |Attorney Docket No. MDIO4232| and also corresponding U.S. patent application Ser. No. 07/970,289, bearing the same title, same inventors and also filed Nov. 2, 1992;

(E) PCT Patent Application Ser. No. PCT/US92/09460, entitled METHOD AND APPARATUS FOR UPDATING A CLUT DURING HORIZONTAL BLANKING, by inventors R. J. Mical et al., filed Nov. 2, 1992, |Attorney Docket No. MDIO4250| and also corresponding U.S. patent application Ser. No. 07/969,994, bearing the same title, same inventors and also filed Nov. 2, 1992;

(F) PCT Patent Application Ser. No. PCT/US92/09342, entitled RESOLUTION ENHANCEMENT FOR VIDEO DISPLAY USING MULTI-LINE INTERPOLATION, by inventors R. J. Mical et al., filed Nov. 2, 1992, |Attorney Docket No. MDIO3050| and also corresponding U.S. patent application Ser. No. 07/970,287, bearing the same title, same inventors and also filed Nov. 2, 1992;

(G) U.S. patent application Ser. No. 08/146,505 entitled DISPLAY LIST MANAGEMENT MECHANISM FOR REAL-TIME CONTROL OF BY-THE-LINE MODIFIABLE VIDEO DISPLAY SYSTEM, by inventors R. J. Mical et al., filed Nov. 1, 1993 |Attorney Docket No. MDIO4255|;

(H) U.S. patent application Ser. No. 08/001,463 entitled DIGITAL SIGNAL PROCESSOR ARCHITECTURE, by inventor Donald Gray III, filed Jan. 6, 1993 |Attorney Docket No. MDIO4210|;

(I) PCT Patent Application Ser. No. PCT/US92/09348, entitled METHOD FOR GENERATING THREE DIMENSIONAL SOUND, by inventor David C. Platt, filed Nov. 2, 1992, |Attorney Docket No. MDIO4220| and also corresponding U.S. patent application Ser. No. 07/970,274, bearing the same title, same inventor and also filed Nov. 2, 1992 (Exception: this U.S. application is no longer co-pending because it issued Aug. 9, 1994 as U.S. Pat. No. 5,337,363.);

(J) PCT Patent Application Ser. No. PCT/US92/09384, entitled PLAYER BUS APPARATUS AND METHOD, by inventors David L. Needle et al., filed Nov. 2, 1992, |Attorney Docket No. MDIO4270| and also corresponding U.S. patent application Ser. No. 07/970,151, bearing the same title, same inventors and also filed Nov. 2, 1992; and (K) U.S. patent application Ser. No. 08/088,045 entitled IMPROVED METHOD AND APPARATUS FOR DIGITAL MULTIPLICATION BASED ON SUMS AND DIFFERENCES OF FINITE SETS OF POWERS OF TWO, by inventor David R. Main, filed Jul. 6, 1993 |Attorney Docket No. MDIO4330|.

2b. Cross Reference to Related Other Publications

The following publication(s) is/are believed to be related to the present application and is/are cited here for purposes of reference:

(A) ISO/IEC Standard 11172-2, "INFORMATION TECHNOLOGY—CODING OF MOVING PICTURES AND ASSOCIATED AUDIO FOR DIGITAL STORAGE MEDIA AT UP TO ABOUT 1.5 Mbits/s", 1993, American National Standards Institute (ANSI); and (B) CCIR Recommendation 601-2, "Encoding Parameters of Digital Television for Studios", 1982–1986–1990.

3. Description of the Related Art

A number of techniques have and are continuing to be developed for reproducing full motion picture imagery and sound from digitally stored information.

One such technique includes the steps of: (a) compressing a digitized version of a motion picture (comprised of audio and video portions) using an MPEG compression algorithm or the like; (b) recording the compressed digital signal onto a digital storage media such as a 5.25 inch CD-ROM disk; (c) playing the CD-ROM disk so as to reproduce the compressed signal; (d) decompressing the played back signal into a real time motion picture signal by using an MPEG decompression algorithm or the like; and (e) displaying in real time the image portion of the decompressed signal while simultaneously outputting the sound portion so as to substantially replicate both the audio and video portions of the original motion picture.

The MPEG (Moving Pictures Expert Group) compression/decompression algorithms have become industry standards for compressing the contents of full motion video (FMV) so that such contents can be recorded onto 5.25 inch CD-ROM disks and the like. The MPEG-1 decompression algorithm is used in FMV products such as the Phillips CD-I™ Full-Motion system (available from Phillips Consumer Electronics of the Netherlands) and such as the Sony Video Compact Disc™ system (available from Sony of Japan). Use of more advanced compression/decompression algorithms such as the MPEG-2 and MPEG-4 standards is expected in future products.

MPEG's popularity is due in part to its ability to conform to the standard motion picture rate of 24 frames per second and also to a wide variety of television broadcast formats including NTSC and PAL.

The NTSC standard is based on analog signals. Given this, one generally needs a digital format of approximately 352-by-240 rectangular pixels per frame delivered at 30 frames per second (60 interlaced fields per second) in order to produce a high-fidelity digitized version of an NTSC-encoded motion picture.

The PAL standard is also based on analog signals. One generally needs a digital format of approximately 352-by-288 pixels per frame delivered at 25 frames per second (50 interlaced fields per second) in order to produce a high-fidelity digitized version of a PAL-encoded motion picture.

An MPEG-1 decompression system can deliver its frames in many formats including so-called SIF formats (Standard Interface Format). The SIF format for NTSC systems is 352×240×24/30, which is shorthand for: 352-by-240 digital pixels per frame delivered at either 24 or 30 frames per second, depending on a flag that specifies the source of the audio and video material. The SIF format for PAL systems is 352×288×25. The SIF pixels for both the NTSC and PAL systems are rectangular in shape rather than square. Header information is included within SIF formatted bitstreams for indicating which of the 352×240×24 format, or 352×240×30 format, or 352×288×25 format is being used.

A so-called 3:2 pull-down technique, which is known to those skilled in the art, may be used to convert from the SIF rate of 24 frames per second to the 30 frames per second commonly used in NTSC television systems.

The analog-based NTSC and PAL broadcast formats use one or both of a so-called "super-white" magnitude region and a so-called "super-black" magnitude region for horizontal and/or vertical scan synchronization. To conform with this usage, the MPEG decompression algorithms (MPEG-1, MPEG-2, MPEG-4) output signals having so-called magnitude "dead spaces" in conformance with the CCIR-601 standards. The upper and/or lower ends of each 8-bit value range, 0–255, are not used.

The lower dead space of an 8-bit wide MPEG-1 signal is the range, 0–15. The upper MPEG-1 dead space varies slightly depending on context. In some instances the upper dead-space is the range, 240–255, and in others it is 235–255.

The advantages of digital recording and play-back are numerous and well elaborated in the literature. Accordingly they will not be repeated here.

Recently, artisans in the field have begun to explore ways of taking advantage of the random access nature of video CD's and of the digital nature of the audio and video content produced by MPEG decompression. One such exploration involves the step of altering the rate and sequence in which video CD sectors are accessed for decompression. Slow motion pictures and interactive story lines can be created with such techniques. Another such path of exploration involves the step of digitally manipulating the MPEG decompression output; for example, digitally cropping-out or painting over parts of a motion picture.

In the Phillips CD-I™ Full-Motion system, for example, provisions are made for changing playback speed from normal speed to slow motion, or to displaying a single still picture or to stepping (scanning) through a sequence of so-called "full-quality" still pictures. A video switch is provided within the Phillips CD-I™ system for extracting a rectangular slice of a first motion picture and display it within another CD-I image. (Phillips refers to this as "picture windows".)

These are interesting first steps in exploiting the potential of digitized full motion video. There are, however, many further things that could be done if a few deficiencies in conventional MPEG processing could be rectified.

The low quantization-fidelity that occurs in MPEG output signals as a result of the MPEG dead-spaces poses one such deficiency. Quantization error tends to increase undesirably as the quantization range of a digital signal decreases.

The 352 non-square pixels-per-line format of the MPEG output signals poses a second such deficiency. Post-compression processing might call for square pixels and a different, perhaps even variable, number of pixels-per-line.

Decompression and digitization artifacts such as "blocking" and "banding" (defined below) pose yet a third such deficiency. These digitally-induced visual artifacts take away from the realism of what could otherwise be a high-fidelity, realistic-looking motion picture.

SUMMARY OF THE INVENTION

It is an object of the present invention to provide methods and devices for adapting MPEG decompression output to enable a wide range of high-fidelity, real-time, post-decompress, digital manipulations of full motion video.

A first aspect of the invention is to transmit frames of decompressed full motion video to a real time image processing system that can geometrically transform the video image in real time by imparting skew, rotation, size-rescaling, or like effects to the image and which can further transform colorations within the image in real time by performing interpolation, palette substitutions, color blends, and other color re-mapping operations on the decompressed image.

A second aspect of the invention is to eliminate all or part of the "dead-space" and to thereby expand the quantization range of the colors represented by an MPEG-decompressed, full-motion video signal.

A third aspect of the invention is to transform the resolution of an MPEG decompressed full motion video image in the pixels-per-line domain by resampling the image in real time so that it conforms to a programmably-defined number of pixels-per-line. The resampled signal is thereafter manipulated by one or more image processing algorithms that are configured for the programmably-defined number of pixels-per-line. In one embodiment, the programmably-defined number of pixels-per-line are selected in combination with a programmably-defined number of lines-per-frame so as to create an output image having a 4:3 aspect ratio (horizontal versus vertical dimension) that has substantially "square" pixels. The 4:3 aspect ratio is used for forming conventional NTSC and PAL television pictures.

A fourth aspect of the invention is to apply a programmable dither to the pixels of the MPEG decompressed full motion video image so as to minimize artifacts caused by digitization and decompression.

A system in accordance with the invention comprises: (a) decompressor means for decompressing a pre-compressed digital representation of a full motion video, where the decompressor means outputs a decompressed first video signal having a first format; (b) real-time processor means for digitally processing in real time, the video image represented by the first video signal, where the processor means is configured to process image data having a second format, different from the first format; and (c) adaptor means, interposed between the decompressor means and the processor means, for converting the decompressed first video signal in real time into a second decompressed first video signal having the second format.

A method in accordance with the invention comprises the steps of: (a) playing back the contents of a CD-ROM disk or the like which has a compressed full-motion picture recorded thereon; (b) decompressing the playback contents; (c) applying the decompressed contents in real-time to a real-time video/audio data processing system for real-time manipulation; and (d) outputting the manipulated video/ audio information to a human observer/listener.

BRIEF DESCRIPTION OF THE DRAWINGS

The below detailed description makes reference to the accompanying drawings, in which.

DETAILED DESCRIPTION

Figure 1:
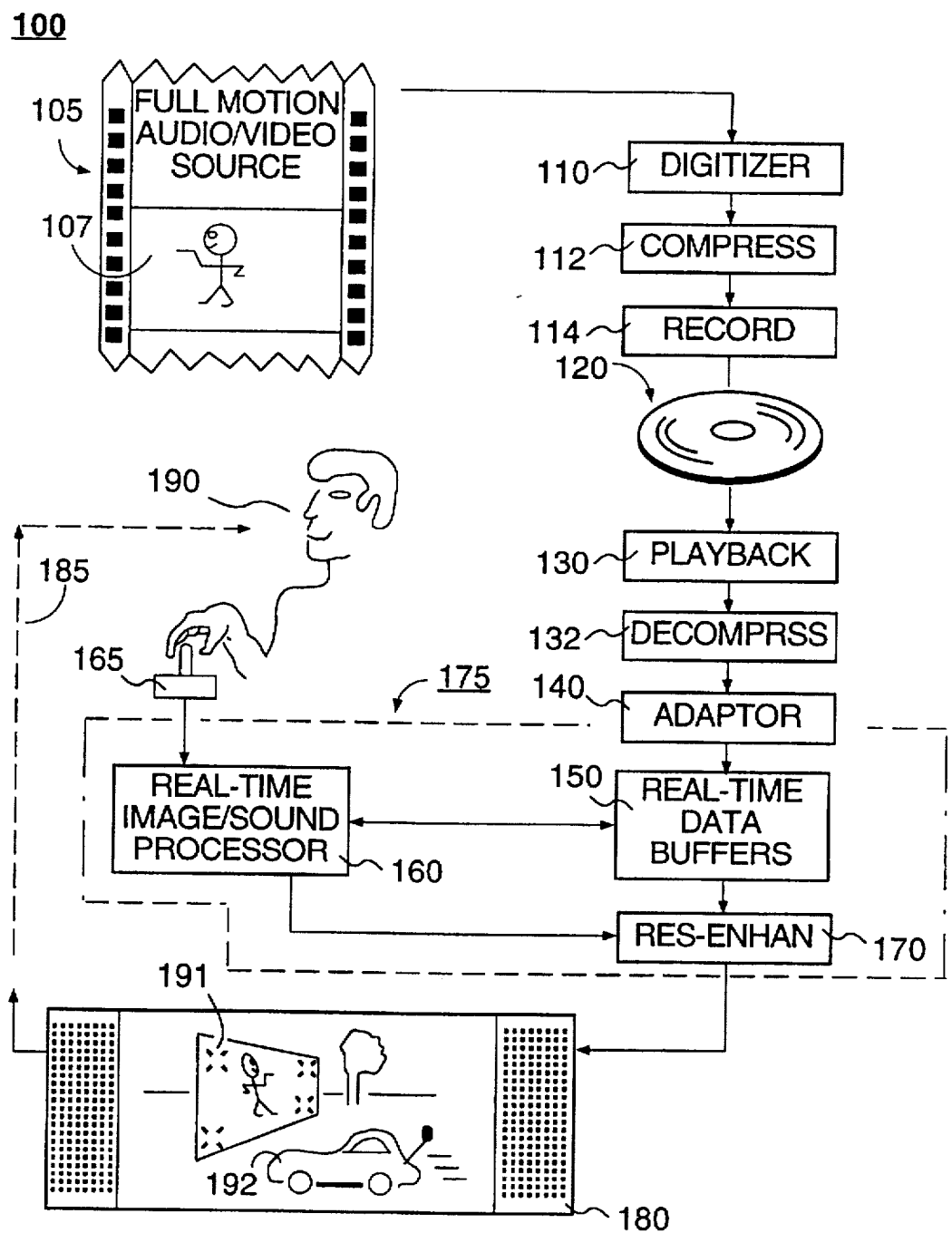
FIG. 1 is a block diagram of a first full motion video system in accordance with the invention.

Referring to FIG. 1, a block diagram of a first full motion video system 100 in accordance with the invention is shown.

In this system 100, a digitizer 110 converts an analog version 105 of a full motion picture (including audio and video portions) into a digitized version.

The full motion audio/video source material 105 includes a plurality of frames, each representing the full motion material at a given instant in time. By way of example, one frame 107 is illustrated as showing a plan view of a person walking with one arm raised and the other lowered. The full motion audio/video source material 105 is typically intended to be shown to a human observer/listener (190) at a predefined rate such as 24 frames per second.

The digitizing step (110) may be omitted if the full motion source material 105 is already in digital form.

At a next step, a data compressor 112 compresses the video portion, and optionally also the audio portion, of the digitized full motion material. Data compressor 112 is preferably one that conforms to one of the Moving Picture Experts Group's compression algorithms such as MPEG-1, MPEG-2 or MPEG-4. Other audio/video compression algorithms may be used as well. The goal is to squeeze a relatively voluminous amount of video information (and less-voluminous audio information) onto a next-described storage medium 120 of limited size and throughput rate.

A recording mechanism 114 records the compressed audio/video material onto medium 120. Medium 120 has a limited storage capacity as explained above, and also a limited data transfer rate during playback/retrieval (130). Because of these limitations, it is desirable to have the data compressor 112 compress the original full motion source material 105 as much as possible without undue degradation of picture and sound quality.

The storage medium 120 can be in the form of a video compact disk (video CD) or of a digital-data compact disk (CDROM) or the like. A typical physical size for a video CD disk is 5.25 inch in diameter. The storage capacity is sufficient for holding and playing back the equivalent (after MPEG-1 compression) of as much as 74 minutes of full-speed, stereophonic, high-quality motion picture information (played back at 24 or 25 or 30 frames per second). The data transfer rate during playback (retrieval) on a so-called, single-speed CD drive can be as high as 1.20 Megabits per second (Mbit/s) of which 1.15 Mbit/s is consumed for transferring video data. Higher transfer rates are of course possible. The Phillips CD-I system available from Phillips NV is indicated as having a play back rate of 1.40 Megabits/ second. The 3DO Interactive Multiplayer™ system available under the Panasonic™ brand name has a so-called double-speed CD drive capable of transferring data at 2.40 Mbit/s and thereby providing greater fidelity per frame.

In CD technology, digital information is recorded as optically detectable marks or pits onto concentric or spiral tracks of an optical disk. A laser beam is bounced off the marks and into a photodetector during playback. Relatively high storage capacities and data throughput rates may be obtained with CD technology. The invention is not limited, however, to CD recording and playback. Other record and playback techniques such as those based on magnetic or magneto-optical or semiconductor-storage based (e.g., flash EEPROM) recording and playback may be used instead.

After the compressed motion picture is recorded onto the storage medium 120, the medium 120 can be shipped or its contents can be transmitted to an authorized user for use and enjoyment. In the case of physical shipment, the user may insert the shipped storage medium 120 (e.g., video CD) into a playback mechanism 130 and activate the playback mechanism 130 so that the compressed information recorded on storage medium 120 is reproduced. In the case where the data is otherwise transmitted, a service provider may have possession of the storage medium 120, and upon request, may playback the contents with the appropriate mechanism 130 and transmit the reproduced, compressed information to the user.

The playback output rate for "single"-speed CD-ROM players is typically 1.2 to 1.4 Mbit/s and for "double"-speed players it is typically 2.4 Mbit/s. But of course, the playback mechanism 130 is not limited to such playback rates. Higher data transfer rates are expected to be available with next-generation devices. A conventional video CD implementation in accordance with the MPEG-1 standard calls for a minimum playback speed of 1.15 Mbit/s for reproducing the video portion of a full motion picture.

The playback output is decompressed by decompressor 132 in accordance with an appropriate decompression algorithm such as one of the MPEG algorithms. The output rate of the decompressed video should be roughly 165 Mbit/s in accordance with international standard CCIR 601, or better. The throughput rate of the decompressed audio should be approximately 1.4 Mbit/s or better.

In accordance with the invention, the decompressed audio and video signals are next passed, at their respective full playback rates of for example, 1.4 Mbit/s or more (for audio) and 165 Mbit/s or more (for video), through a real-time adaptor 140. The real-time adaptor 140 conditions the signals in real time for further processing by a subsequent, real-time image/sound processor 160 (hereafter also, R-TIS processor 160).

The R-TIS processor 160 is part of an overall realtime data processing system 175 (shown as a dash-dot box) that is configured to operate with pre-defined frame formats such as 320-by-240 square pixels when in an NTSC mode and such as 384-by-288 square pixels when in a PAL mode. (The real-time data processing system 175 includes the R-TIS processor 160 in combination with the below-described data buffers 150 and the below-described resolution-enhancing subsystem 170.)

The output of decompressor 132 is typically in a format such as the NTSC standard interface format (SIF) of 352-by-240 rectangular pixels per frame or the PAL-SIF format of 352-by-288 rectangular pixels per frame. Such a SIF format is different from the 320-by-240 square pixels per frame format or the 384-by-288 square pixels per frame format expected by the R-TIS processor 160. (The square-pixel format for each frame may be advantageously used by the R-TIS processor 160 for performing recursive image rotations, and/or rescalings, and/or other geometric transformations without requiring special handling for the X axis and the Y-axis as would be the case if each of the source pixels were asymmetric.)

One task of the adaptor 140 is to resample each line of the decompressed video and convert it from the SIF format of 352 pixels-per-line into a programmably-defined one or the other of the NTSC mode format (320 square pixels-per-line) and the PAL mode format (384 square pixels-per-line).

The real-time data processing system 175 (comprised of elements 150, 160 and 170) is configured to operate with a predefined number of bits-per-pixel (BPP). The bits-per-pixel format expected by system 175 may be different from that of the video output of decompressor 132. The decompressed video signal may, for example, use 24 bits per pixel to represent the colors of its corresponding image (8 bits for each of the red, green and blue primaries) while the processing system 175 expects to work with 16 bits per pixel (5 bits for each of the red, green and blue primaries plus an additional "subposition" bit that is used in an interpolation process).

An optional, additional job of adaptor 140 is therefore, to convert the bits-per-pixel format of the decompressed video (e.g., 8/8/8) into a bits-per-pixel format that is acceptable to the real-time data processing system 175 (e.g., 5/5/5/1).

The digital compression and decompression processes (112 and 132) can introduce undesirable visual artifacts into the image of the decompressed signal. One such artifact is sometimes found in MPEG-1 encoding and is referred to as "blocking". Blocking comes about because the MPEG algorithm divides each source frame (107) into 330 macroblocks for NTSC (432 macroblocks for PAL). Each such macroblock is a square of 16-by-16 pixels. The macroblocks do not always stitch back together smoothly after decompression. The edges of the macroblocks may become undesirably noticeable.

Another job of the adaptor 140 is to optionally apply a dithering function to the video output of decompressor 132 that smoothes out digital artifacts such as blocking. The dithering function can be tailored to further smooth out another undesirable visual artifact known as "banding". Banding occurs when less significant bits of each pixel data word are dropped or rounded off. What was intended to be a gradual change in color or luminance across a long series of pixels now becomes a sudden or quantum jump in color/luminance. This gives the appearance of discrete "bands" across the corresponding image region even though the region was supposed to have a continuum of changing color/luminance.

The nature of the dithering function and the pixels-per-line resampling function of the adaptor 140 will become better understood as each of these functions and other functions of the adaptor 140 are described in greater detail below.

The pre-conditioned video signals (and audio signals) that are output by adaptor 140 are next transferred to and stored in one or more real-time data buffers 150 within the real-time data processing system 175. These data buffers 150 may be thought of as video/audio frame buffers, although the definition "data-buffers" is more appropriate because the R-TIS processor 160 includes a parse and re-compile means for compiling or stitching together independent pieces of data from one or more buffers to form displayable/audible frames. (Refer in this regard, to the above-cited application, DISPLAY LIST MANAGEMENT MECHANISM FOR REAL-TIME CONTROL OF BY-THE-LINE MODIFIABLE VIDEO DISPLAY SYSTEM.)

The real-time image/sound processor 160 (R-TIS processor 160) is operatively coupled to buffers 150 for performing a variety of real-time manipulations on the video and audio information contained therein.

The image manipulation operations include programmably-defined size-scaling, rotation, and/or skewing of visual objects (sprytes) on a singular or recursive basis. Size-scaling can be used to create an impression of zooming-in closer to an object or zooming-back away from the object. Rotation and skewing can be used to create an impression of spacial translation relative to an object. The above-cited application of Needle et al., SPRYTE RENDERING SYSTEM WITH IMPROVED CORNER CALCULATING ENGINE AND IMPROVED POLYGON-PAINT ENGINE is incorporated herein by reference for its disclosure regarding various geometric manipulations that may be performed at high speed on visual objects (or "sprytes" which are improved relatives of more commonly known sprite constructs).

The real-time image/sound processor 160 further has means for transforming the colorations of visual objects stored in data buffers 150 and for mixing, blending or cross-modulating these with those of other visual objects stored in buffers 150. The above-cited application of R. J. Mical et al., entitled IMPROVED METHOD AND APPARATUS FOR PROCESSING IMAGE DATA is incorporated herein by reference for its teachings regarding how "spryte" and other visual data constructs may be blended or cross-modulated with one another in real time by using a so-called "PPMP" device within the R-TIS processor 160.

The real-time image/sound processor 160 may further have means for sound processing wherein the impression is created that a sound source is moving through 3-dimensional space. The above-cited applications of Platt, entitled METHOD FOR GENERATING THREE DIMENSIONAL SOUND and of Gray, entitled DIGITAL SIGNAL PROCESSOR ARCHITECTURE, are incorporated herein for their teachings in regard to this feature.

Display means are provided within the real-time data processing system 175 for assembling image frames and transmitting them to a video monitor 180. In this regard, the disclosure of the above-cited application, DISPLAY LIST MANAGEMENT MECHANISM FOR REAL-TIME CONTROL OF BY-THE-LINE MODIFIABLE VIDEO DISPLAY SYSTEM is incorporated here by reference.

The resolution of the video signal sent from buffers 150 to monitor 180 may be enhanced in real time by a resolution-enhancing subsystem 170 to create an appearance a higher resolution than that stored in data buffers 150. In this regard, the disclosure of the above-cited application RESOLUTION ENHANCEMENT FOR VIDEO DISPLAY USING MULTI-LINE INTERPOLATION is incorporated here by reference. Palette substitutions may be carried out as the real-time modifiable imagery of data buffers 150 is transferred by way of resolution enhancer 170 to a display monitor 180. In this regard, the disclosure of the above-cited application METHOD AND APPARATUS FOR UPDATING A CLUT DURING HORIZONTAL BLANKING is incorporated here by reference.

The audio content of the signal sent from buffers 150 to monitor 180 may be enhanced in real time by an audio portion of the resolution-enhancing subsystem 170 to create the impression of three-dimensional sound. In this regard, the disclosure of the above-cited application DIGITAL SIGNAL PROCESSOR ARCHITECTURE is incorporated here by reference.

Upon exiting the resolution enhancer 170, the real-time modifiable imagery and sound of data buffers 150 is transferred to a stereo television monitor 180 or the like for enjoyment by a human observer/listener ("user") 190. The audio/visual coupling between monitor 180 and user 190 is denoted by dashed line 185. User 190 operates a real-time interactive control mechanism (e.g. joystick, mouse, buttons pad) 165 that is coupled to processor 160. The R-TIS processor 160 responds to the interactive actuations of interactive control mechanism 165 by performing real-time transformations on video, audio and/or other data stored in the data buffers 150.

By "real-time", it is meant here that the user 190 perceives an almost immediate response in the output of stereo television monitor 180 to user actuations of the interactive control mechanism 165. The term "almost-immediate" is understood here to mean within roughly 300 milliseconds or less, which is the average response time for most users. The term "full motion video" is understood here to mean that user 190 perceives the displayed material as being a continuous animated show when played back at the normal speed of 24 to 30 frames per second. The term "real-time modifiable imagery and sound" is understood here to mean that user 190 continues to perceive the displayed material as being a continuous animated show when played back at the normal speed of 24 to 30 frames per second even when the real-time data processing system 175 modifies the imagery and sound by imparting respective, 3-dimensional image and sound transformations to the decompressed original material.

For purposes of illustration, it is assumed that user 190 is playing an interactive video game (or other video-based simulation) whose imagery and sound are output from monitor 180.

In the illustrated game example, a vehicle 192 is displayed and made to move through a 3-dimensional background scene in accordance with actuations by the user 190 of interactive control mechanism 165—as if vehicle 192 were a remotely-controllable vehicle and interactive control mechanism 165 were the remote control.

The 3-dimensional scene through which the vehicle 192 maneuvers includes a surface 191 onto which there is projected part or all of one or more image frames 107 from the full motion video source 105. The respective sizes of the projection and surface 191 may be re-scaled (together or independently), in real time response to actuations of the interactive control mechanism 165, to create the illusion of the vehicle 192 moving closer to or further away from the projection surface 191. The projection and surface 191 may be skewed and/or rotated, again in real time response to actuations of the interactive control mechanism 165, to create the illusion of three-dimensional translation of the vehicle 192 relative to the projection surface 191.

In addition, the projection surface 191 may have a texture (color patterning) of its own that is not found in the original motion picture frame 107. This projection surface texture is represented in FIG. 1 by "X" shaped stipplings at the four corners of trapezoid 191. The R-TIS processor 160 includes so-called "PPMP" means for optionally blending the colorations of the projection surface texture with the colorations of the projected image so that the projected image appears to be truly "projected onto" the projection surface 191 rather than merely painted over it. On the other hand, the "PPMP" means of the R-TIS processor 160 can be programmably controlled so that its color-blending operation is turned off (either gradually or abruptly), to leave one or the other of the projection surface texture and the projected image remains fully painted over the trapezoidal area denoted as 191 in FIG. 1.

In the example of FIG. 1, projection surface 191 and its corresponding projected image are skewed into a trapezoidal shape even though the original frame 107 is rectangular in shape. This gives the illusion of 3-dimensional perspective. —as is well known to artists in the field of conventional drawing and painting—that one part of the projection surface 191 is closer to the viewer (190) and another part is positioned deeper into the background. Also for the example of FIG. 1, the projection on surface 191 is rotated opposite to the left-to-right orientation of the original frame 107. While frame 107 shows a person walking to the left, the R-TIS processor 160 can arbitrarily rotate and skew this imagery so the person appears to be walking in another direction, such as to the right and deeper into the background of the overall scene.

The vehicle 192 may be made to pass in front of the projection surface 191. In such a case, opaque portions of vehicle 192 will be displayed as obscuring (painting over) the underlying portions of projected motion picture 191. If the vehicle has transparent or tinted windows, the underlying portions of projected motion picture 191 may be made to appear as if they are passing through the vehicle windows, perhaps even with a color alteration due to a tinting of the vehicle windows. (The latter operation may be performed by using the color-blending features of the "PPMP" portion of the R-TIS processor 160.)

The realism of this game scene may be further enhanced by introducing three-dimensional sound manipulation. A predefined point on projection surface 191 may be considered a sound source and vehicle 192 may be considered as the location of the left and right ears of user 190. As the vehicle 192 is made to move either to the left of sound source 191, or to the right, or closer, or further away; the sound from the stereo speakers of monitor 180 may be appropriately modulated to give the user 190 an audio-based impression of being immersed in the hypothetical three-dimensional world of the game.

Figure 2:
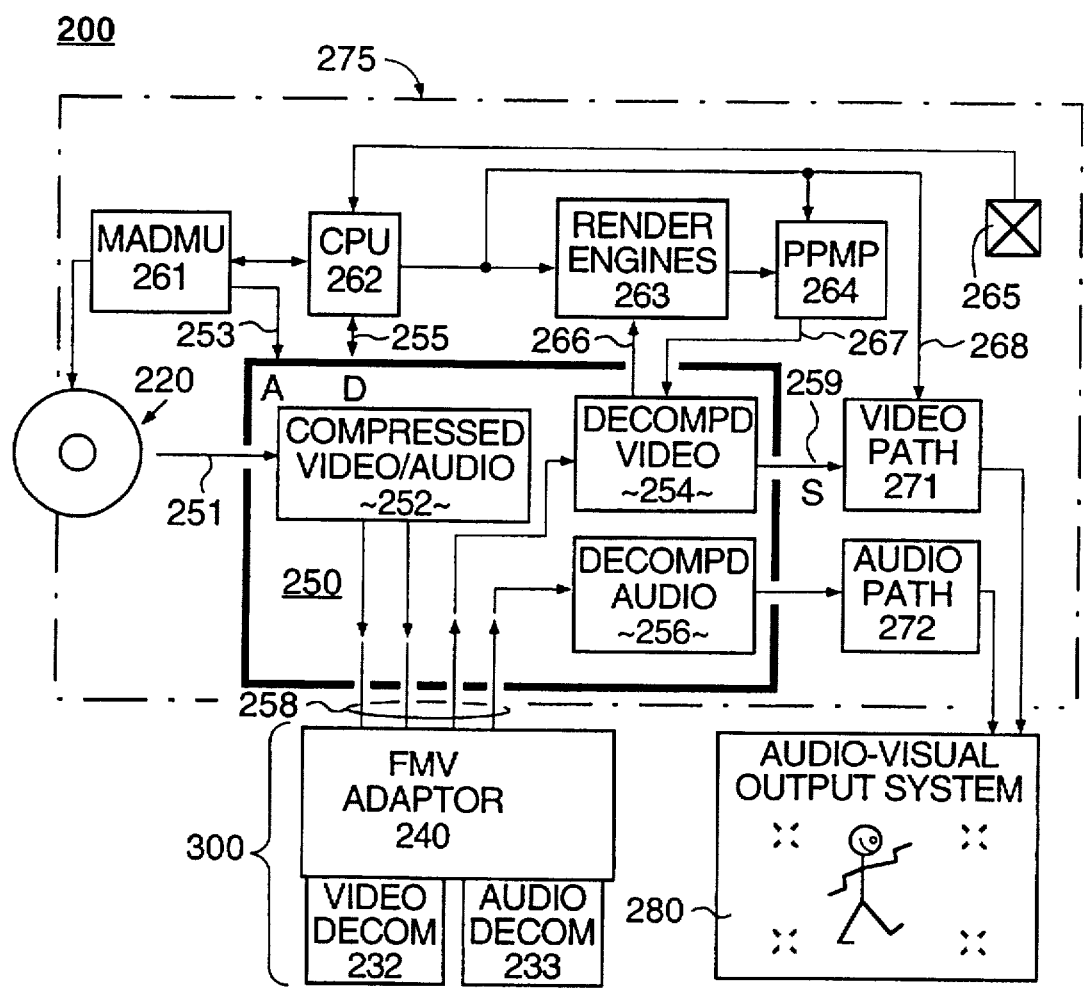
FIG. 2 is a block diagram of a second full motion video system in accordance with the invention that is composed of an FMV-enabling cartridge plugged into a 3DO Multiplayer™ system.

Referring to FIG. 2, the above-described operations for three-dimensional realism can be carried out with a so-called "3DO Interactive Multiplayer™" system in combination with a Full Motion Video Adaptor (FMVA) which will be detailed herein. The 3DO Interactive Multiplayer™ system is designed by the 3DO Company of Redwood City, California and is available from licensed manufacturers such as Matsushita Electric Industrial Co. Ltd. of Japan under the Panasonic™ brand name.

The illustrated combination of FIG. 2 is referred to here as second full motion video system 200. Where possible, like reference symbols and numbers in the "200" series are used for elements of FIG. 2 which correspond to but are not necessarily the same as the elements represented by similar symbols and reference numbers of the "100" series in FIG. 1.

System 200 includes a machine-readable system memory 250. The system memory 250 is typically comprised of a VRAM (Video Random Access Memory) section and an optional DRAM (Dynamic Random Access Memory) section. The system memory 250 may also include a ROM (read only memory) section. The VRAM section is used for outputting bit streams at video rate so that the output data can be projected in real time on a video monitor (with or without intermediate processing). Other high speed memory configurations, can of course, also be used. One example is a so-called RAMBUS configuration that provides memory access at higher bandwidth than conventional DRAM. Another is a so-called Synchronous-DRAM configuration.

The programmably-alterable portions of system memory 250 are logically subdivided into a plurality of operating areas including a first operating area 252 for storing compressed video and audio signals; a second operating area 254 for storing decompressed video data; and a third operating area 256 for storing decompressed audio data.

In one embodiment, the system memory 250 is dual ported so that it can support high-bandwidth data transfers. It has a parallel first port and a serial second port. The parallel first port connects to system address bus 253 and system data bus 255. The serial second port connects to a serial stream bus 259 (S-bus). For the sake of illustrative brevity, the system data bus 255 is shown coupled only to system CPU 262, however, it is to be understood that many other devices connect to data bus 255. Access to the system data bus 255 is provided on a time multiplexed basis. A memory address management unit (MADMU) 261 grants time slots to requesting devices on a prioritized basis and asserts corresponding addresses on system address bus 253.

Some of the time slots are reserved for so-called DMA channels. A first of the DMA channels, 251, is used for transferring compressed audio/video data from CD-ROM drive 220 to the compressed A/V area 252. A set of four other DMA channels, which set is denoted as 258, is used for unpacking (parsing apart) the compressed video from the compressed audio, sending the compressed video to a video decompressor 232, sending the compressed audio to an audio decompressor 233, returning decompressed video data to the decompressed video area 254, and returning decompressed audio data to the decompressed audio area 256.

The serial stream bus 259 periodically collects lines of image data from the decompressed video area 254 (which collections are each in the form of two lines per collection for one embodiment that has a downstream interpolator requiring adjacent pixels from a 'previous' and 'current' image line) and forwards the video data to the audio/visual output system 280 by way of video path 271. Audio data is similarly retrieved from the decompressed audio area 256 and sent to output system 280 by way of audio path 272.

The video output path 271 includes a programmable color look-up table (CLUT), not shown, for performing color conversions in accordance with conversion instructions sent from the system CPU 262. The video output path 271 further includes a programmable interpolator (not shown) for increasing the apparent resolution of the output image in response to interpolation on/off commands sent from the system CPU 262. The video output path 271 additionally includes an interface means (not shown) for interfacing with the video portion of audio/visual output system 280.

The audio output path 272 includes its own interface means (not shown) for interfacing with the audio portion of output system 280 and may optionally include an audio-DSP means (digital signal processing means) for imparting various three dimensional effects to the output audio screen in response to DSP control commands sent from the system CPU 262.

The system's central processing unit (CPU) 262 sets up source and destination pointers for use by the memory address management unit (MADMU) 261, in accordance with software loaded into the system memory 250, for directing DMA transfers of compressed video blocks to the video decompressor 232 and of compressed audio blocks to the audio decompressor 233. The transfer is pipelined through an FMV adaptor 240, which will be described shortly.

The CPU 262 also establishes control pointers for carrying out DMA transfers of already decompressed data respectively from decompressors 232 and 233 to decompressed holding areas 254 and 256. Prior to arriving at the decompressed video storage area 254, the decompressed video data is pre-conditioned within the FMV adaptor 240 as will be explained shortly.

The CPU 262 additionally services high-level tasks that do not require high-speed throughput. These high-level, low-throughput tasks include the initialization of system resources, including those of the just-mentioned FMV adaptor 240 and of an associated video decompressor 232 and of an associated audio decompressor 233. (The combination of elements 240, 232 and 233 defines a plug-in, FMV cartridge 300 described below.) The high-level, low-throughput tasks of the system CPU 262 further include: responding to various service interrupts that occur during the normal course of decompression (e.g., end-of-DMA, new-frame-decoded, etc.) and responding to encountered errors or exceptions.

Image data within the decompressed video storage area 254 can be transformed in real time, when desired, by one or more of an available plurality of spryte rendering engines 263 and also by way of a so-called "PPMP" unit (Pen and Palette Manipulator Processor) 264.

FIG. 2 schematically shows decompressed data being pulled out of storage area 254 by way of path 266 for manipulation by the spryte rendering engines 263 and the PPMP 264 and thereafter being returned by path 267 to storage area 254. It is to be understood that this is merely exemplary and different areas of system memory 250 can serve respectively as the source and destination areas for the spryte rendering engines 263 and the PPMP 264 and for the current frame buffer whose imagery is being currently displayed.

The operations of the spryte rendering engines 263 and the PPMP 264 are supervised by the CPU 262. Details regarding the operations of the spryte rendering engines 263 may be found in the above-cited U.S. patent application Ser. No. 07/970,289. Details regarding the operation of the PPMP 264 may be found in the above-cited U.S. patent application Ser. No. 07/970,083.

As further shown in FIG. 2, the system CPU 262 is responsive to an interactive control mechanism 265 which an observer/listener (not shown) of monitor 280 actuates in real time. The CPU 262 then responsively sends commands to the spryte rendering engines 263, and/or the PPMP 264, and/or the video and audio output paths 271 and 272, for altering the animated imagery and sound coming out from the audio-visual output system 280 in real time. This responsive control connection between the system CPU 262 and elements 263, 264, 271 and 272 is schematically indicated by line 268.

Details regarding a color look-up table (CLUT) found within the video output path unit 271 may be found in the above-cited U.S. patent application Ser. No. 07/969,994. Details regarding an interpolation unit found within the video output path 271 may be found in the above-cited U.S. patent application Ser. No. 07/970,287. Details regarding the coupling of the interactive control mechanism 265 to the CPU 262 may be found in the above-cited U.S. patent application Ser. No. 07/970,151.

For convenience sake, the combination of the following elements: (a) MADMU 261, (b) CPU 262, (c) spryte rendering engines 263, (d) PPMP 264, (e) interactive control mechanism 265, (f) system memory 250, and (g) video and audio output paths, 271 and 272; will be referred to as a real-time data processing system 275. The boundaries of the data processing system 275 are denoted in FIG. 2 by a dash-dot line.

Like the real-time data processing system 175 of FIG. 1, the real-time data processing system 275 of FIG. 2 has an NTSC format mode (that expects image data to be presented as 320 square pixels-per-line) and a PAL format mode (that expects image data to be presented as 384 square pixels-per-line).

The FMV adaptor unit 240 combines with the video decompressor 232 and audio decompressor 233, to form a plug-in cartridge 300 which removably connects to the system bus of the real-time data processing system 275. This connection is indicated at 258.

One of the tasks of the FMV cartridge 300 is to supply full motion video and audio data in real time to respective storage areas, 254 and 256, of the system memory 250. The contents of the decompressed video storage area 254 can then be transformed in real time by the operations of one or more of already-described units 262, 263, and 264. The output of storage area 254 can be further altered in real time by operations of unit 271. The decompressed audio that is supplied to storage area 256 is subject to real time manipulations as it passes through the audio output path unit 272. Alternatively, the contents of the decompressed video storage area 254 and those of the decompressed audio storage area 256 can be passed through, in basically unaltered form, to the audio/visual output system 280.

As a result of this arrangement, the audio-visual material output by monitor 280 can include a full motion picture segment whose video portion is unaltered or is rotated, skewed, re-scaled, re-colored, or otherwise transformed in real time response to interactive actuations of control mechanism 265 and whose sound portions are also either unaltered or manipulated in real time response to actuations of interactive control mechanism 265.

Figure 3:
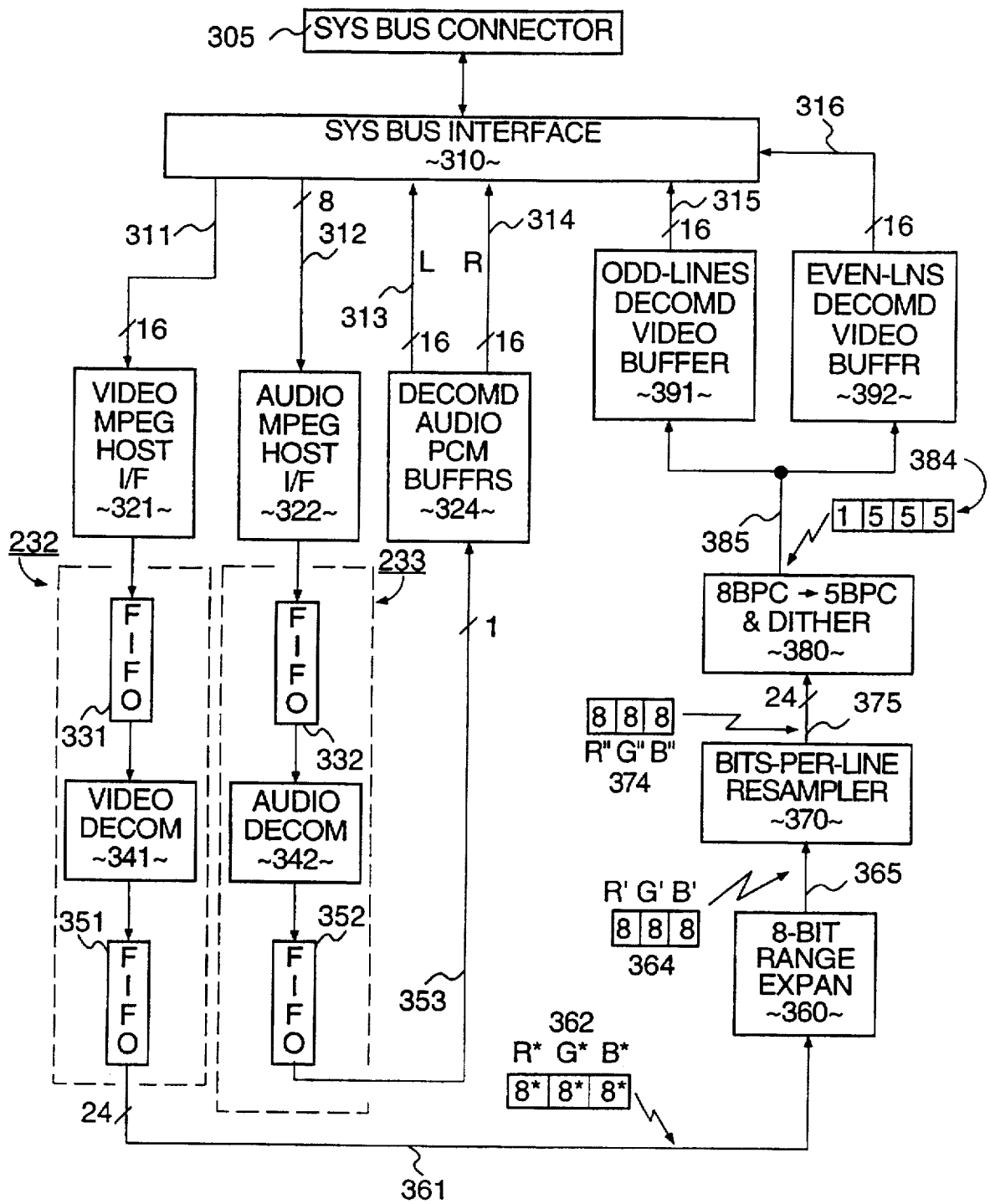
FIG. 3 is a more detailed schematic of an FMVenabling cartridge such as shown in FIG. 2.

FIG. 3 shows further details of the FMV plug-in cartridge 300. A 68-pin connector 305 connects to the system bus of the 3DO Multiplayer™ System. A system bus interface circuit 310 is provided within cartridge 300 for inputting and outputting signals from/to the system bus during appropriate time slots. The interface circuit 310 presents programmable portions within the FMV cartridge 300 to the system host as programmable areas of a contiguous memory space or register file.

Connection 311 carries compressed video blocks from the system bus interface 310 to a video MPEG host interface circuit 321. Second connection 312 carries compressed audio blocks from the system bus interface 310 to an audio MPEG host interface circuit 322.

Host interface circuits 321 and 322 connect respectively to video and audio decompression circuits 232 and 233. In one embodiment, the video decompression circuit 232 is a C-Cube CL450™ MPEG video-decompression integrated circuit chip which is available from C-Cube Microsystems of Milpitas, California. Other video decompression chips may be, of course, used in its place as appropriate. In the same embodiment, the audio decompression circuit 233 is a TI 320 AV110™ MPEG audio-decompression integrated circuit chip available from Texas Instruments of Dallas, Texas. Other audio decompression chips may be, of course, used in its place as appropriate. Alternatively, two or more of the video decompressor 232, audio decompressor 233 and other portions of the FMV cartridge 300 can be integrated into a single integrated circuit chip. In one embodiment, the circuitry of FIG. 3 except for the video decompressor 232, the audio decompressor 233 and the system bus connector 305, is all integrated into a single integrated circuit chip.

The video decompression circuit 232 is shown at a block diagram level as having an input FIFO (First-In, First-Out storage buffer) 331 feeding an internal video decompression block 341, and an output FIFO 351 for outputting decompressed video blocks. As well known in the art, such FIFO's (331, 351) are used for transmitting bursts of data between synchronous circuits operating at different clock speeds and/or in different time frames. In the instant case, the video decompressor 232 can operate at a different clock speed than that of the system bus (258) to which the FMV cartridge 300 connects.

In similar fashion, the audio decompression circuit 233 is shown at a block diagram as having an input FIFO 332 feeding compressed audio blocks to an internal audio decompression module 342, and an output FIFO 352 for outputting decompressed audio blocks. FIFO's 332 and 352 allow the audio decompressor 233 to operate at a different clock speed than that of the system bus (258) to which the FMV cartridge 300 connects.

The output line 353 of FIFO 352 forwards decompressed audio blocks, or "frames", serially (as 1-bit wide data) to a set of audio-channel data-storage buffers 324, further provided within FMV cartridge 300. These audio-channel buffers 324 parse the decompressed audio signals into separate left and right channel signals which are respectively output on 16-bit buses 313 and 314 to the system bus interface 310 during appropriate DMA time slots.

The output of video FIFO 351 is a 24-bit wide bus 361 that carries decompressed color information 362 to a next-described range expansion module 360. If desired, the decompressed output signal 362 can be routed by a user-programmable multiplexer (not shown) to circumvent the range expansion module 360 and instead move on to a resampling module 370 located further downstream.

The 24-bit wide data of bus 361 is subdivided into three color fields (e.g., Red, Green and Blue) each 8 bits wide. Normally, each 8-bit field should define a digitized range of 256 steps. However, the MPEG-1 decompression algorithm creates "dead spaces" in each color range, as explained above. The full potential of each 8-bit field is therefore not utilized. An asterisk ("*") is placed next to each 8-bit field of data construct 362 (R*/G*/B*) to indicate the presence of this dead-space condition.

The range expansion module 360 assumes that the lower dead space of each color field is 0–15 and optionally, that the upper dead space is 240–255. Range expansion is then performed (for a first embodiment) in accordance with the following equation, Eq. 1:

$$R'=(R-16)\cdot 8/7 \qquad \{Eq. 1\}$$

where R represents the value of each of the MPEG color fields taken one at a time (red, green, blue) and R' represents the corresponding expanded color value. We use the red field as an example, but it is understood the same operation is performed in parallel for the green and blue fields. Although not shown, the range-expansion function of module 360 be bypassed by alternatively routing the RGB components of the decompressed output signal 362 through a programmably-actuated bypass multiplexer (not shown) whose output feeds the resampling module 370.

Those skilled in the art will recognize that it is relatively difficult to divide binary-coded values by 7 in short time while using relatively small amounts of circuit area (using little real estate on an integrated circuit chip). On the other hand, the real time operations that are to be carried out by the FMV cartridge 300 are preferably performed as economically as practical within the limited physical confines of a single integrated circuit and/or within the limited physical confines of the plug-in cartridge. This means that there should be as few pipeline registers as possible even though synchronism with the system video clock is desirable. And hence, it means that the electronic emulation of Eq. 1 should be carried out in minimal time and with as few adders or other components as possible in order to avoid the consumption of valuable on-chip real estate.

The FMV cartridge 300 has to throughput data at a rate matching that of the full motion video being transferred through it. The full motion video can have throughput rates of as much as 24 to 30 frames per second and 82.5 Kbits (compressed) per frame, or higher. In terms of decompressed data, the throughput of the FMV cartridge 300 should be at least 384×288×3=331,766 KBytes per frame, or higher to support multi-color square-pixel PAL.

The following approximation (Eq. 2) has been found to be advantageous for speeding the operation, and more importantly reducing the size, of the range expansion module 360 that is to emulate it:

$$8/7 = 1.142857\ldots \qquad \{Eq. 2\}$$
$$\approx 1 + 1/8 + 1/64 = 1.140625$$

With the approximation of Eq. 2, the first equation, Eq. 1, is transformed into the following:

$$R'=(R-16)\cdot (1+1/8+1/64) \qquad \{Eq. 3\}$$

Equation Eq. 3 can then be expanded as shown in the following Eq. 4:

$$R'=(1/64)\cdot (8\cdot (R-16)+(R-16)+(R-16)) \qquad \{Eq. 4\}$$

The operations to the right of the (1/64) term are preferably carried out first to preserve precision and then a shift right operation is performed to emulate multiplication by the (1/64) term.

Equation Eq. 4 can be simplified by substituting the difference term, "D" for each "(R−16)" term to yield the following Eq. 5:

$$R'=(1/64)\cdot (8\cdot D+D+D) \qquad \{Eq. 5\}$$

Figure 4A:
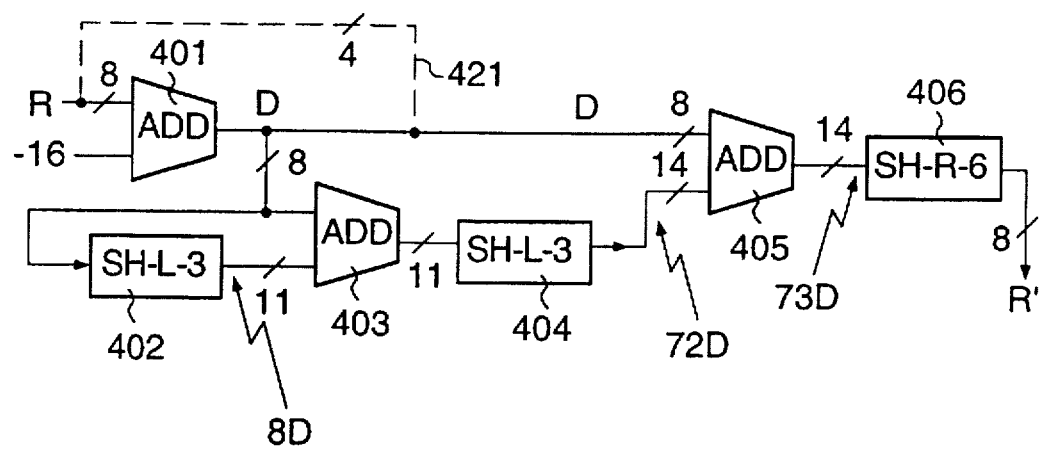
FIG. 4A is a schematic of a first range expansion module in accordance with the invention.

Equation Eq. 5 can be emulated electronically with binary shifts and a relatively minimal number of additions as indicated by the digital circuit 400 of FIG. 4A.

In FIG. 4A, adder 401 receives the 8-bit wide, R signal and responsively generates an 8-bit wide, binary-coded output signal representing D=R−16. Note that D is limited to a range of $0 \leq D \geq 224$ due to the definition of the MPEG dead-spaces. The maximum binary-expressed value for D is therefore 1110 0000. It never exceeds 8 bits in length.

Shifter 402 shifts the D signal left 3 bit positions to generate an 11-bits wide, binary-coded, output signal representing 8 times D (whose maximum value in binary is 111 0000 0000). Adder 403 combines the D and 8D signals to generate a 11-bits wide, binary-coded output signal representing 9 times D. (The maximum value of which, in binary, is 111 1110 0000). Shifter 404 shifts the 9D signal 3 places left to generate a 14-bits wide binary-coded output signal representing 72 times D. Adder 405 combines the D and 72D signals to generate a 14-bits wide, binary-coded output signal representing 73 times D. Shifter 406 then shifts the 73D signal 6 places right to generate an 8-bits wide, binary-coded output signal, R', representing (72/64)·D.

Shifters 402, 404, 406 are, of course, preferably implemented as wired parallel shifters, wherein the shifted bits are each routed by wiring to the desired bit position and the extra right or left bit positions, if any, are padded with zeroes.

Adders 401, 403, 405 are preferably parallel adders implemented using carry look-ahead designs or equivalents. (See, however, below explanation with regard to how adder 401 can be implemented as a decrementer to obtain further circuit minimization and faster speed.)

It is to be understood that the same circuit 400 is replicated three times in the range expansion module 360 to respectively expand the quantization ranges of the R*, G* and B* fields of data structure 362 and produce therefrom the 24-bit wide, expanded data structure shown at 364 (R'/G'/B').

It should be noted here, that the decompression unit (232) may be made as a programmable type rather than as a hardwired type. When such a programmable decompression unit (232) is available, it is possible to programmably define the conversion parameters that define the linear transform of converting from a YUV color space to an RGB color space. The color-space conversion parameters can be set such that, if there is an upper dead space in the original video signal, that upper dead space can be eliminated by programming the YUV to RGB conversion to extend into the upper dead space. The gain factor, g, of the following matrix-equation, Eq. 5a is simply increased from unity to, for example, 256/224 in order to eliminate the upper deadspace of the CCIR-601 standard.

$$\begin{bmatrix} R \\ G \\ B \end{bmatrix} = g \cdot \begin{bmatrix} \ldots \\ \ldots \\ \ldots \end{bmatrix} \cdot \begin{bmatrix} Y \\ C_R \\ C_B \end{bmatrix} \qquad \{Eq. 5a\}$$

In the above Eq. 5a, the middle matrix is a 3-by-3 matrix representing the inverse of the CCIR-601 matrix for converting from RGB to YUV, which matrix is known in the art. Y represents luminance and $C_R$ and $C_B$ represent the two other coordinates of YUV color space.

If the decompression unit (232) is further programmable such that it is possible to programmably insert an offset into the luminance value when converting from the YUV color space to the RGB color space, then even the lower deadspace can be eliminated by carrying out YUV to RGB conversion in accordance with the following matrix-equation, Eq. 5b:

$$\begin{bmatrix} R \\ G \\ B \end{bmatrix} = g \cdot \begin{bmatrix} \ldots \\ \ldots \\ \ldots \end{bmatrix} \cdot \begin{bmatrix} Y-16 \\ C_R \\ C_B \end{bmatrix} \quad \{\text{Eq. 5b}\}$$

where the gain factor g is appropriately set to at the same time eliminate the upper dead space. If the above Eq. 5b is followed during color space conversion, then the range expansion module 360 may be bypassed.

Figure 4B:
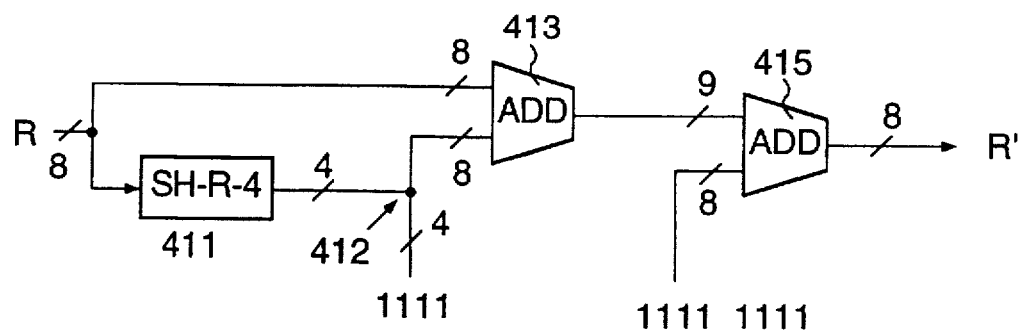
FIG. 4B is a schematic of a second range expansion module in accordance with the invention.

Referring to FIG. 4B, for an alternative embodiment 450, it is assumed that there is no upper deadspace in the 8-bit MPEG fields, because for example, such an upper dead space has been eliminated by appropriately programming an upstream decompression unit in accordance with the Eq. 5a, but that there is a lower deadspace. The range expansion equation of the following Eq. 6 may then be used instead:

$$R'=(R-16)\cdot 17/16 \quad \{\text{Eq. 6}\}$$

Eq. 6 may be advantageously rewritten as the following Eq. 7:

$$R'=(R+(R/16-16))-1 \quad \{\text{Eq. 7}\}$$

Given that R is 8 bits wide, it can be represented by its individual bits in binary-coded form as:

$$R=r_7r_6r_5r_4\,r_3r_2r_1r_0 \quad \{\text{Eq. 8}\}$$

where $r_7$ is the most significant bit.

The term R/16 may then be expressed as:

$$R/16=0000\,r_7r_6r_5r_4 \quad \{\text{Eq. 9}\}$$

where the four most significant bits are each zero.

The $-16$ term of equation Eq. 7 may be expressed in binary-coded form as:

$$-16=1111\,0000 \quad \{\text{Eq. 10}\}$$

where the four most significant bits are each one and the four lesser significant bits are each zero. Putting equations, Eq. 9 and Eq. 10 together, it is observed that the term, R/16−16 may be generated simply by wiring the four most significant bits each as one and the four lesser significant bits as the four upper bits of R to thereby obtain:

$$R/16-16=1111r_7r_6r_5r_4 \quad \{\text{Eq. 11}\}$$

In the embodiment 450 of FIG. 4B, shifter 411 receives the 8-bit wide signal R and outputs a 4-bit wide signal representing $r_7r_6r_5r_4$. Wired combiner 412 combines the 4-bit wide signal, $r_7r_6r_5r_4$ with a 4-bit wide signal representing 1111 to thereby define the 8-bit wide signal representing, (R/16−16)=1111$r_7r_6r_5r_4$. Adder 413 combines the 8-bit wide output of wired combiner 412 with the R signal to produce a 9-bit wide signal representing (R+(R/16−16)). Adder 415 combines the 9-bit wide output of adder 413 with an 8-bit wide signal representing negative one (1111 1111 in binary) to produce an 8-bit wide signal representing the expanding color value, R'.

Those skilled in the art will appreciate that adder 415 does not have to be a full-feature adder since it always has the constant, 1111 1111 (binary), at one of its inputs. This implies that one stage of internal XOR's (exclusive-OR gates) within the adder can be replaced by inverters. Accordingly, adder 415 is preferably implemented as a decrementer rather than a full range adder.

A similar reduction of circuit size and complexity can be performed for the upper 4 bits of adder 413 since they are essentially performing a decrement by one (adding 1111 in binary) plus a carry from the lower 4 bits.

A similar reduction of circuit size and complexity can be performed for the upper 4 bits of adder 401 (FIG. 4A). The −16 value that is applied to the second input of adder 401 can be expressed in binary as 1111 0000. The upper 4 bits imply a decrement by one (adding 1111 in binary) plus a carry from the lower 4 bits. However, the carry portion of the circuit can be omitted in this case because the lower 4 bits of −16 (1111 0000 expressed in binary) are zero so there is no carry. Also, with regard to adder 401, note that the lower 4 bits of the adder output can be simply wired through as being equal to the lower 4 bits of the R signal input since the lower 4 bits of −16 (1111 0000 expressed in binary) are zero. Accordingly, adder 401 can be implemented by wiring the lower 4 bits of R straight through and by performing a decrement operation on the upper 4 bits of the R input. This alternate implementation is represented by dashed connection 421. As should be understood by skilled artisans, the alternate implementation (421) is smaller in size, thus allowing for smaller integrated circuit chips, and has a faster signal propagation speed.

To briefly summarize the features of FIGS. 4A–4B, note that range expansion is generally carried out in accordance with the expansion formula of below equation Eq. 12:

$$R'=(R-L)\cdot(U'-L'+1)/(U-L+1) \quad \{\text{Eq. 12}\}$$

where R represents the value of each of the range-limited (MPEG) color fields taken one at a time (red, green, blue), R' represents the corresponding expanded color value, L represents the lower bound of the rangelimited R value, U represents the upper bound of the range-limited R value, L' represents the lower bound of the expanded R' value, and U' represents the upper bound of the expanded R' value. Equation Eq. 12 reduces to equation Eq. 1 for the values: U'=255, L'=0, U=239, L=16.

The digital emulation of equation Eq. 12 is optimized by finding a finite series of terms whose sum approximates the ratio, (U'−L'+1)/(U−L+1), where each term is equal to two raised to an integer power. See above equation Eq. 2 as an example. Equation Eq. 12 is then transformed into the following equation Eq. 13:

$$R'=(R-L)\cdot(A\cdot 2^{-a}+B\cdot 2^{-b}+C\cdot 2^{-c}+\ldots) \quad \{\text{Eq. 13}\}$$

where A, a, B, b, C, c, etc. are appropriate integers for approximating the ratio (U'−L'+1)/(U−L+1) to a desired degree of accuracy. The number of terms to be summed (e.g., A, B, C) in the approximation ($A\cdot 2^{-a}+B\cdot 2^{-b}+C\cdot 2^{-c}+\ldots$) is preferably three or less. A least common denominator is found and equation Eq. 13 is recast as the following equation Eq. 14:

$$R'=(2^{-d})\cdot(R-L)\cdot(A'+B'+C'+\ldots) \quad \{\text{Eq. 14}\}$$

where the operations to the right of the $(2-d)$ term are carried out first to preserve precision.

Multiplication of the (R−L) term by the (A'+B'+C'+...) term is emulated electronically with binary shifts and a relatively minimal number of additions (e.g., 2 or 3 additions as shown in FIGS. 4B and 4A respectively). In the case where the lower bound of the range-limited R value, L, is equal to two raised to an integer power (e.g., $L=16=2^4$); circuit size may be further reduced by emulating the R–L operation as a shifted decrement; as explained with regard to adders 415 and 401.

Referring again to FIG. 3, the range-expanded output signal 364 of range expansion module 360 is next transmitted over a 24-bit wide parallel bus 365 to resampling module 370. If desired, the output signal 364 can be routed by a user-programmable multiplexer (not shown) to circumvent the resampling module 370 and instead move on to a clip/dither module 380 located further downstream.

Figure 5A:
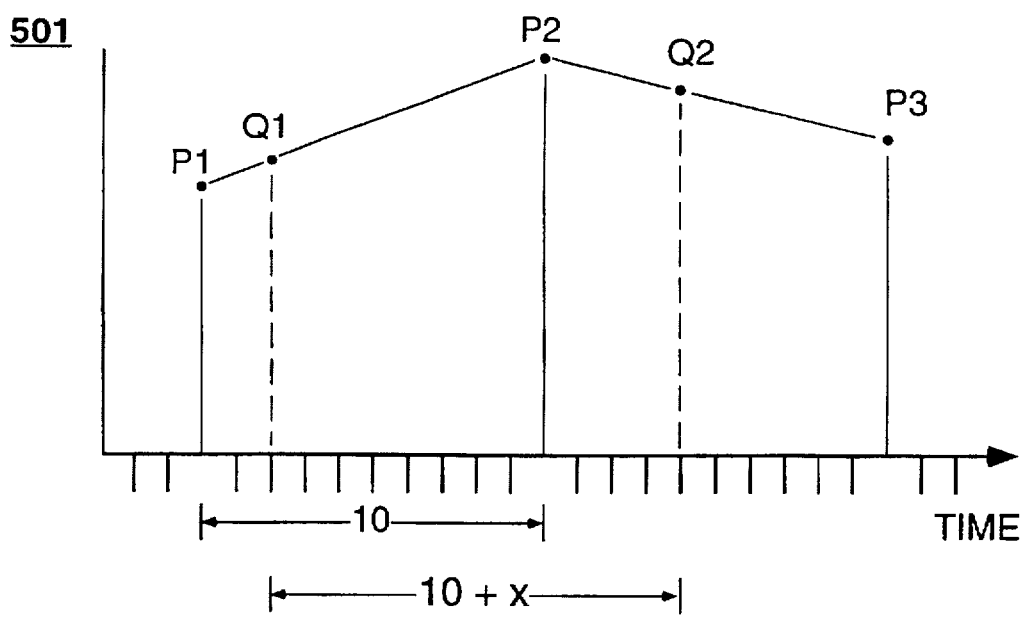
FIG. 5A is a magnitude versus time plot for explaining the resampling process.

Referring to FIG. 5A, an implementation for the resampling module 370 will be described. The 352 pixels-per-line of the SIF format are assumed to be samples of a higher-fidelity signal having, by way of example, 3,520 pixels-per-line (at least one order of magnitude higher). The higher-fidelity signal is assumed to be linear in waveshape between the SIF samples.

In the magnitude versus time plot 501 of FIG. 5A, the point $P_1$ represents the value of a first pixel selected from a SIF line having 352 pixels-per-line. $P_2$ represents the value of an adjacent second pixel selected from the same SIF line. $P_3$ represents the value of an adjacent third pixel selected from the same SIF line. $Q_1$ represents a resampled pixel value located between original points, $P_1$ and $P_2$. $Q_2$ represents a resampled pixel value located between original points, $P_2$ and $P_3$.

The period between original points, $P_1$ and $P_2$, is defined as $T_1$, which in the illustrated example is shown to be 10 time units. The period between resample points, $Q_1$ and $Q_2$, is defined as $T_2$, which in the illustrated example is shown to be 10+x time units, where x is less than 10 but greater than zero ($T_1 < T_2 < 2 \cdot T_1$).

Under this condition, each resampled pixel value $Q_i$, can be defined as a linear combination of a corresponding pair of original points, $P_j$ and $P_{j+1}$, as indicated by below equation Eq. 15:

$$Q_i = a \cdot P_j + b \cdot P_{(j+1)} \quad \{Eq. 15\}$$

wherein, $0 \leq a \leq 1$, $0 \leq b \leq 1$, and $a+b=1$; and further wherein j is equal to i plus a phase difference. (See below Table 1 with regard to how the phase difference progresses from one re-sampled point to the next.)

As already mentioned, the real-time data processing systems 175 (of FIG. 1) and 275 (of FIG. 2) each have an NTSC format mode that expects image data to be presented as 320 pixels-per-line, and a PAL format mode that expects image data to be presented as 384 pixels-per-line. The SIF format of 352 pixels-per-line (ppl) is ten percent greater than the 320 ppl format of the NTSC mode. For every ten NTSC pixels, there are 11 SIF pixels. The ratio of the SIF 352 ppl format to the PAL 384 ppl format is 11/12. For every eleven SIF pixels, there are 12 PAL pixels.

The below Table-1 shows how conversion from SIF to NTSC mode can be carried out using an 11-in/10-out algorithm.

TABLE 1

| SIF TO NTSC RESAMPLE ALGORITHM | |
|---|---|
| NTSC PIXEL OUT | SIF PIXELS IN |
| $Q_0$ | $1.0(P_0) + 0.0(P_1)$ |
| $Q_1$ | $0.9(P_1) + 0.1(P_2)$ |
| $Q_2$ | $0.8(P_2) + 0.2(P_3)$ |

TABLE 1-continued

| SIF TO NTSC RESAMPLE ALGORITHM | |
|---|---|
| NTSC PIXEL OUT | SIF PIXELS IN |
| $Q_3$ | $0.7(P_3) + 0.3(P_4)$ |
| $Q_4$ | $0.6(P_4) + 0.4(P_5)$ |
| $Q_5$ | $0.5(P_5) + 0.5(P_6)$ |
| $Q_6$ | $0.4(P_6) + 0.6(P_7)$ |
| $Q_7$ | $0.3(P_7) + 0.7(P_8)$ |
| $Q_8$ | $0.2(P_8) + 0.8(P_9)$ |
| $Q_9$ | $0.1(P_9) + 0.9(P_{10})$ |
| $Q_{10}$ | $0.0(P_{10}) + 1.0(P_{11})$ |
| $Q_{11}$ | $0.9(P_{12}) + 0.1(P_{13})$ |
| ... | ... |
| ... | ... |

Note in the above Table-1 that 10 pixels go out for every 11 coming in. Note also that the phase difference (j–i) between incoming pairs of original points, $P_j$ and $P_{j+1}$, and the corresponding outgoing, resampled-pixel value $Q_i$, increases periodically (e.g., at the transition above from $Q_9$ to $Q_{11}$).

The below Table-2 shows how conversion from SIF to PAL mode can be carried out using an 11-in/12-out algorithm.

TABLE 2

| SIF TO PAL RESAMPLE ALGORITHM | |
|---|---|
| PAL PIXEL OUT | SIF PIXELS IN |
| $Q_0$ | $(0/12)*P_{-1} + (12/12)*P_0$ |
| $Q_1$ | $(1/12)*P_0 + (11/12)*P_1$ |
| $Q_2$ | $(2/12)*P_1 + (10/12)*P_2$ |
| $Q_3$ | $(3/12)*P_2 + (9/12)*P_3$ |
| $Q_4$ | $(4/12)*P_3 + (8/12)*P_4$ |
| $Q_5$ | $(5/12)*P_4 + (7/12)*P_5$ |
| $Q_6$ | $(6/12)*P_5 + (6/12)*P_6$ |
| $Q_7$ | $(7/12)*P_6 + (5/12)*P_7$ |
| $Q_8$ | $(8/12)*P_7 + (4/12)*P_8$ |
| $Q_9$ | $(9/12)*P_8 + (3/12)*P_9$ |
| $Q_{10}$ | $(10/12)*P_9 + (2/12)*P_{10}$ |
| $Q_{11}$ | $(11/12)*P_{10} + (1/12)*P_{11}$ |
| $Q_{12}$ | $(0/12)*P_{10} + (12/12)*P_{11}$ |
| $Q_{13}$ | $(1/12)*P_{11} + (11/12)*P_{12}$ |
| ... | ... |
| ... | ... |

Note in the above Table-2 that 12 pixels go out for every 11 coming in. Note also that the phase difference (j–i) between incoming pairs of original points, $P_j$ and $P_{j+1}$, and the corresponding outgoing, resampled-pixel value $Q_i$, increases periodically (e.g., at the transition above from $Q_{11}$ to $Q_{13}$). There is one boundary condition not covered by the above table. According to the algorithm of Table-2, $Q_{383}$ would be set to $(11/12)*P_{351}+(1/12)*P_{352}$. However, there is no $P_{352}$. So instead, $Q_{383}$ is set fully equal to $P_{351}$.

The output entries of above Table-1 can be redefined according to below equation Eq. 16a:

$$Q_i = (1/10) \cdot (A \cdot P_j + B \cdot P_{j+1}) \quad \{Eq. 16a\}$$

wherein, $0 \leq A \leq 10$, $0 \leq B \leq 10$, $A+B = 10$, and A and B cycle in accordance with Table-1; and further wherein j is equal to i plus the appropriate phase difference.

Similarly, the output entries of above Table-2 can be redefined according to below equation Eq. 16b:

$$Q_i = (1/12) \cdot (A \cdot P_j + B \cdot P_{j+1}) \quad \{Eq. 16\}$$

wherein, $0 \leq A \leq 12$, $0 \leq B \leq 12$, $A+B=12$, and A and B cycle in accordance with Table-2; and further wherein j is equal to i plus the appropriate phase difference.

The terms, $A \cdot P_j$ and $B \cdot P_{j+1}$, of Eq. 16a–16b can be emulated electronically by a set of binary shifters and adders in accordance with the operations indicated by below Table-3.

TABLE 3

GENERATIONS OF MULTIPLES 0–12

| DESIRED MULTIPLE | SUM OF SHIFTS |
|---|---|
| 0*P | 0 |
| 1*P | P |
| 2*P | 2*P |
| 3*P | 2*P + P |
| 4*P | 4*P |
| 5*P | 4*P + P |
| 6*P | 4*P + 2*P |
| 7*P | 4*P + 2*P + P |
| 8*P | 8*P |
| 9*P | 8*P + P |
| 10*P | 8*P + 2*P |
| 11*P | 8*P + 2*P + P |
| 12*P | 8*P + 4*P |

Figure 5C:
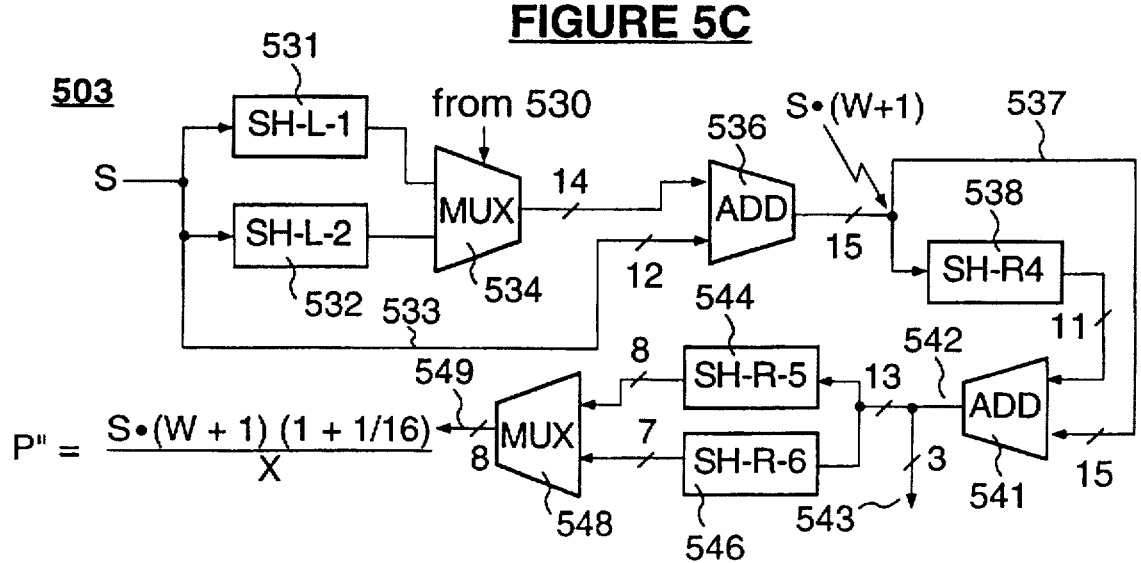
FIG. 5C is schematic of a programmable-divide portion of an image resampler in accordance with the invention.
Figure 5B:
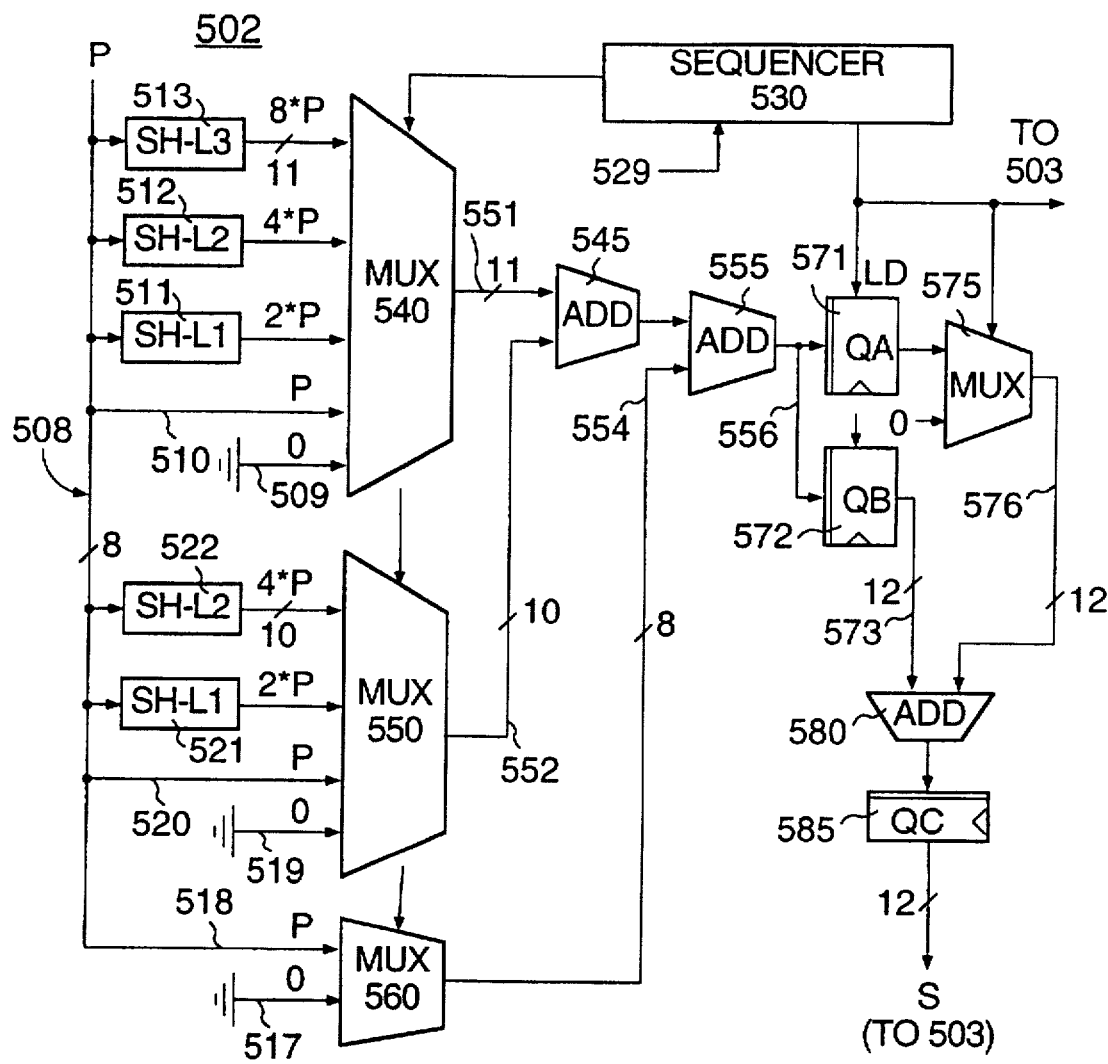
FIG. 5B is schematic of a weight-and-sum portion of an image resampler in accordance with the invention.

FIGS. 5B illustrates a schematic of a weight-andsum circuit 502 of relatively minimal size for electronically emulating the multiples-generate and sum operations indicated by Table-3. An 8-bit wide bus 508 carries a signal, P that represents over time the sequential series of range-expanded values of one of the colors in the red, green, and blue channels. Circuits 502 (FIG. 5B) and 503 (FIG. 5C) are understood to be replicated three times so that each set of resampling circuits 502–503 independently services a respective one of the red, green and blue color channels (R'/G'/B'). The combination of the three pairs of resampling circuits 502–503 defines resampling module 370 (FIG. 3).

Bus 508 couples the P signal series to multiplexers 540, 550 and 560 both directly (by way of lines 510, 520 and 518) and indirectly (by way of parallel shift circuits 511, 512, 513, 521 and 522). Each of the parallel shifters, 511–513 and 521–522 is implemented with parallel bus wiring, as is well known in the art. The outputs of shifters 511–513 are supplied to multiplexer 540. Shifter 511 performs a 1-bit left shift operation to produce an output signal representing P multiplied by two. Shifter 512 performs a 2-bit left shift operation to produce a signal representing P multiplied by four. Shifter 513 performs a 3-bit left shift operation to produce a signal representing the value P multiplied by eight. Line 510 delivers a signal representing P multiplied by one to the input of multiplexer 540. Line 509 delivers a signal representing the value zero to the input of multiplexer 540.

A sequencer 530 drives the input select port of multiplexer 540 so as to produce at the output 551 of multiplexer 540 an 11-bit wide signal representing a selected one of the values: 8*P, 4*P, 2*P, 1*P, and 0.

Sequencer 530 further drives the input select ports of multiplexers 550 and 560 and additionally those of below-described multiplexers 575, 534 and 548 (the latter two are in FIG. 5C). Sequencer 530 also drives the load-control inputs of a set of below-described D-type flip flop registers 571 and 572. The sequencer 530 is responsive to a programming signal 529 supplied from the system CPU 262 so as to operate in either an NTSC mode or a PAL mode in accordance with above Tables 1 through 3. The bitstream received from video decompressor 232 includes header information indicating whether the corresponding video data is in NTSC format or PAL format. This header information circumvents the range expansion module 360 by using the above-mentioned, user-programmable multiplexer (not shown) that circumvents the range expansion module 360. This programmably-controlled multiplexer (not shown) routes the non-expanded header data to the resampling module 370 where it is used to select the appropriate one of the NTSC mode and the PAL mode. If desired, resampling can be disabled within weight-and-sum circuit 502 by programmably setting the outputs of multiplexers 550, 560 and 575 to zero. Alternatively, the above-mentioned user-programmable multiplexer (not shown) that circumvents the resampling module 370 can be used.

As seen in FIG. 5B, multiplexer 550 is similarly coupled to lines 519 and 520, and to shifters 521–522 to produce at a 10-bit wide output port 552 thereof a signal representative of a selected one of: 4*P, 2*P, 1*P and 0, in response to a selection made by sequencer 530. Multiplexer 560 produces at an 8-bit wide output port 554 thereof, a signal representative of either 1*P or 0 in response to sequencer 530.

Adder 545 adds together the signals from the respective outputs, 551 and 552, of multiplexers 540 and 550. Adder 555 adds together the outputs of adder 545 and multiplexer 560.

Appropriate operation of sequencer 530 produces at the output 556 of adder 555 a result signal representing any desired one of the values 0*P through 12*P in accordance with above TABLE-3. The multiplication result on output 556 is loaded in alternating manner into one of a pair of D-type flip flop registers 571 and 572 under control of sequencer 530.

Adder 580 sums the respective outputs, 573 and 576, of registers 571 and 572 to produce a sum signal S representative of a weighted sum of a current source pixel $(P_{(j+1)})$ and a previous source pixel $(P_j)$. This weighted sum signal, $S=(A \cdot P_j + B \cdot P_{j+1})$, is stored in register 585 and thereafter forwarded to the programmable-divide circuit 503 shown in Fig. 5C.

The circuit to the left of adder output 556 operates at twice the frequency of that at which the weighted-sum signal, S, is produced and consumed so that registers 571 and 572 generally supply valid, previous and current, weighted pixel values $(B \cdot P_{j+1}, A \cdot P_j)$ in pace with the rate at which the programmable-divide circuit 503 consumes each sequential, weighted-sum, S. Multiplexer 575 is controlled by sequencer 530 to deliver a zero value on line 576 to adder 580 for boundary conditions in which the contents of register 571 are invalid.

If desired, the weighting of the pixel values, P, can be carried out by a more generic multiplier circuit such as disclosed in the above-cited application Ser. No. 08/088,045 which is incorporated herein by reference.

The programmable divider circuit 503 of Fig. 5C performs approximated divisions by one of the divisor values, 10 and 12, in accordance with programming instructions provided by sequencer 530.

Multiplication by the factors, 1/10 and 1/12, of equations Eq. 16a–16b is difficult to carry out efficiently in small circuit space for binary-coded input parameters. However, the approximations set forth in the following equations Eq. 17a–17b make the machine-implemented digital-emulation simpler, smaller, and faster:

$$1/10 \approx 1/16 + 1/32 + 1/256 + 1/512 = 0.099609 \quad \{\text{Eq. 17a}\}$$

$$1/12 \approx 1/16 + 1/64 + 1/256 + 1/1024 = 0.083007 \quad \{\text{Eq. 17b}\}$$

The above approximations of equations Eq. 17a–17b have respective errors of roughly 0.4% and 0.3%. It is noted for above Eq. 17a that the 1/16 term is two times the 1/32 term, while simultaneously, the 1/256 term is two times the 1/512 term. It is similarly noted for above Eq. 17b that the 1/16 term is four times the 1/64 term. while simultaneously, the 1/256 term is four times the 1/1024 term. Thus, equations Eq. 17a–17b can be rewritten to have similar forms as indicated respectively by below equations Eq. 18a–18b:

$$1/10 \sim (2+1) \cdot (1/32) + (2+1) \cdot (1/512) \qquad \{\text{Eq. 18a}\}$$

$$1/12 \sim (4+1) \cdot (1/64) + (4+1) \cdot (1/1024) \qquad \{\text{Eq. 18b}\}$$

It is then noted that Eq. 18a–18b can be represented generically by the below equation Eq. 19:

$$1/Y \sim (W+1) \cdot (1/X) + (W+1) \cdot (1/16X) \qquad \{\text{Eq. 19}\}$$

where for the respective NTSC and PAL format modes: Y=10 or 12, W=2 or 4 and X=32 or 64. (W and X are programmably-defined, nonzero integers.)

Equation Eq. 19 can be multiplied by S and rewritten as below equation Eq. 20:

$$S/Y \sim S \cdot (W+1) \cdot (1+1/16)/X \qquad \{\text{Eq. 20}\}$$

Referring to FIG. 5C, a programmable divider circuit 503 will be described for electronically emulating the operation of above equation Eq. 20. The 12-bit wide weighted-sum signal, S. is applied to parallel shifters 531 and 532 which respectively perform a 1-bit and 2-bit shift left operation.

Multiplexer 534 selects the output of one of left shifters 531 and 532 and applies the selected signal to a first, 14-bit wide input of adder 536. A 12-bit wide bus 533 carries the S signal to a second input of adder 536. Multiplexer 534 is controlled by sequencer 530 so as to set the value of W (from above equation Eq. 20) equal to two or four, as desired. Adder 536 then generates a 15-bit wide output signal (onto 15-bit wide bus 537) which is representative of the value, S·(W+1).

Parallel shifter 538 performs a 4-bit shift right operation on the signal output from adder 536 and supplies the resultant 11-bit wide signal to a first input of adder 541. Bus 537 carries the 15-bit output of adder 536 to a second input of adder 541. Adder 541 then produces an output signal 542 representative of the value S·(W+1)·(1+1/16).

The adder output signal 542 is applied in parallel to parallel shifters 544 and 546, which respectively perform a 5-bit and 6-bit shift right operation. The output of right-shifter 544 is an 8-bit wide signal that is applied to a first input of multiplexer 548. The output of right-shifter 546 is a 7-bit wide signal that is applied to a second input of multiplexer 548. The least significant, eighth bit, of the second input to multiplexer 548 is fixed at zero.

Multiplexer 548 outputs an 8-bit wide signal 549 representative of the resampled pixel value:

$$P'' = S/Y \sim (1/X) \cdot ((S \cdot (W+1)) \cdot (1+1/16)).$$

Sequencer 530 controls multiplexer 548 to select the value of X as equal to 32 or 64.

Since the second input (537) of adder 541 is 15-bits wide, the output 542 of the adder should, by rights, be 16-bits wide. However, since the output of the 5-bit right shifter 544 is only 8-bits wide, the three least significant bits of output 542 are immediately discarded as indicated by line 543. Accordingly, the output of adder 541 need be no larger than 13-bits wide. But since shifter 544 is going to discard the next, less significant five bits of the adder output 542, the output of adder 541 can be reduced to being only 8-bits wide. The more significant eight bits of adder 541 are thus transferred by direct wiring to the first input of multiplexer 548 while the second input of multiplexer 548 receives the same signal wire-shifted to the right by one bit.

Referring to FIG. 3, the P'' re-sampled outputs of the red, green and blue channels of the re-sampler module 370 are respectively shown at 374 as R'', G'' and B''. A command received from the system CPU 262 by way of the system bus interface circuit 310 tells the resampling module 370 whether to perform resampling for NTSC or PAL mode—or not at all by routing the signal through the above-mentioned programmable multiplexer (not shown) that circumvents the resampling module 370.

The 24-bit wide re-sampled signal 374 is next carried by a 24-bit wide bus 375 to a module 380 which performs a conversion from eight bits per color component (BPC) to five bits per color component and which optionally dithers the signals of each color channel prior to the BPC reduction.

Figure 6A:
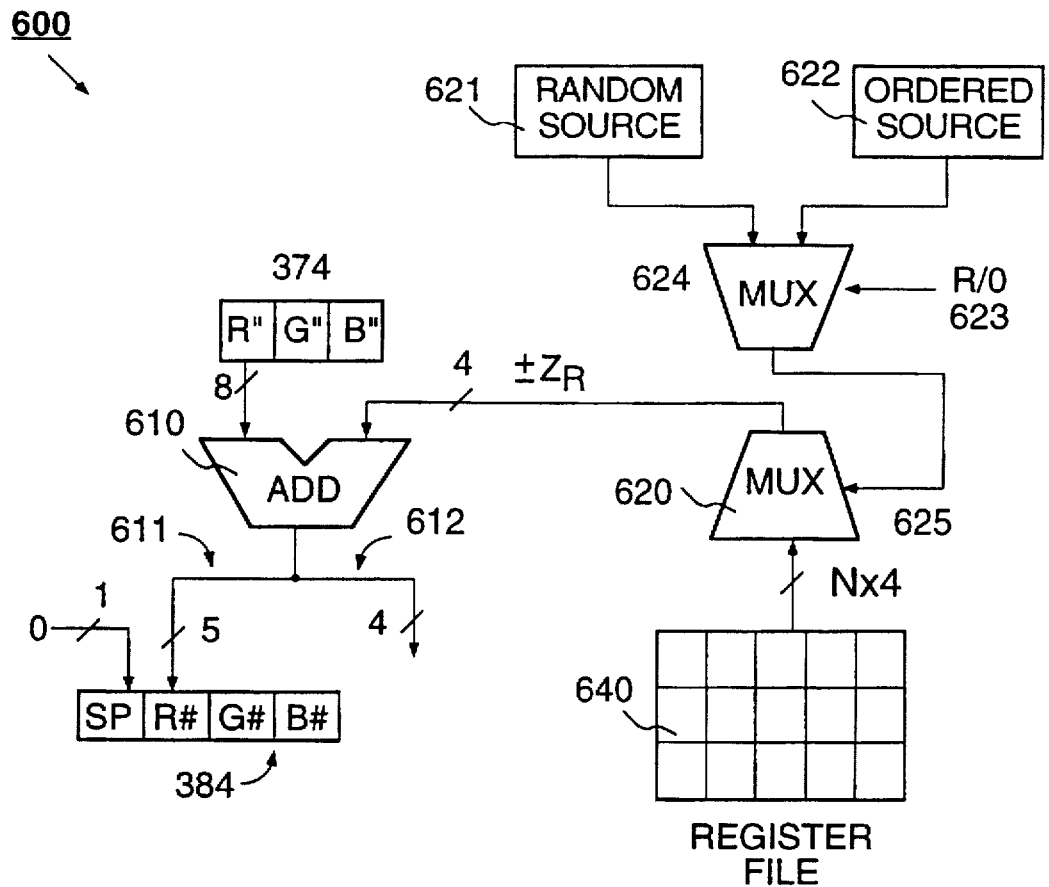
FIG. 6A is schematic of a programmable dither circuit in accordance with the invention.

Referring to FIG. 6A, it is to be noted that a simple truncation of one or more least significant bits (LSB's) of each 8-bit wide color signal (for the purpose of generating a signal having fewer bits per color, e.g., 5-BPC) can produce undesired visual artifacts such as "banding". In the embodiment of FIG. 6A, a 4-bit wide, signed dithering value, $\pm Z_R$, is first added to the 8-bit wide signal representing a corresponding color value (e.g. R'') of the re-sampled signal 374, prior to reducing the signal to 5-BPC. Then the five most significant bits (611) of the addition operation are used to define the corresponding value R# in the reduced bits-per-color signal 384.

FIG. 6A accordingly shows an adder 610 which receives at a first input thereof the 8-bit wide color signal R'' and which receives at a second input thereof, a corresponding 3-bit wide dithering signal $\pm Z_R$. The five most significant bits of adder 610 are used to define the R# field of the 16-bit wide output signal 384 as indicated at 611 while the less significant 4-bits are discarded (truncated, or not generated in the first place) as indicated at 612.

In general, there are a plurality of different ways for defining the dither signal $\pm Z_R$.

A first such way is referred to here as "random-noise dithering". In random-noise dithering, the dither signal $\pm Z_R$ is produced by a true or pseudo-random value generator.

A second dither approach is referred to here as "ordered dithering". In this second case, the dithering signal $\pm Z_R$ is generated by sequencing in an ordered way through a predefined series of values.

A third dither approach is referred to here as "constant dithering". In this third case, the dithering signal $\pm Z_R$ is held constant.

Random-noise dithering, ordered-dithering and constant-dithering each have advantages and disadvantages depending on the content of the visual data that is to be dithered. The circuit 600 of FIG. 6A can be programmed to provide any one these different types of dithering for a given frame or other given image portion. (The speed and timing of a switch from a first to another of these different types of dithering can be arranged to occur on a per line basis or per pixel basis if desired.)

Dither circuit 600 includes a programmable register file 640 that stores a predefined number N of 4-bit wide, signed dither values (each in two's complement format). Multiplexer 620 selects a positive or negative value from the register file 640 in accordance with a selection signal 625 and outputs the selected register file value as the dither signal $\pm Z_R$. The selection signal 625 can change with each clock cycle or remain the same.

In one embodiment, register file 640 is a four-by-four ordered table of pre-defined 4-bit signed values (each arranged as a sign bit followed by 3 magnitude bits in two's complement format). The table values are user-programmable and can be changed on a frame by frame basis or on another periodic basis (e.g., once per scan line).

Two signal sources are provided for defining the select signal 625. One of the sources is a pseudorandom noise generator 621, the construction of which is well known in the art. (The construction of random noise generator 621 is referred to in some applications as a "CRC" generator or Cyclical Redundancy Check generator and generally comprises a loop of exclusive-OR gates and registers where the interconnection between registers and XOR gates defines the CRC polynomial.)

The second source is an ordered-number generator 622 which can be simply a sequential counter with a fixed periodicity (e.g., it counts from zero to 15 and then repeats). If desired, the periodicity of the counter 622 be changed by programming, so it counts 0–14 instead of 0–15 for example. In one embodiment, the ordered-number generator 622 produces a modulo-16 output of the current pixel position where the pixel position is represented by a current line (row) value and a current column value. The below TABLE-4 provides an example of one such modulo-16 ordered sequence based on current pixel address, where the sequence output is given in hexadecimal format.

TABLE 4

PIXEL ADDRESS BASED ORDERED SEQUENCING

| Row | Col. 0 | 1 | 2 | 3 | 4 | 5 | 6 | 7 | ... |
|---|---|---|---|---|---|---|---|---|---|
| 0 | 0 | 1 | 2 | 3 | 0 | 1 | 2 | 3 | ... |
| 1 | 4 | 5 | 6 | 7 | 4 | 5 | 6 | 7 | ... |
| 2 | 8 | 9 | A | B | 8 | 9 | A | B | ... |
| 3 | C | D | E | F | C | D | E | F | ... |
| 4 | 0 | 1 | 2 | 3 | 0 | 1 | 2 | 3 | ... |
| ... | | | | | | | | | |

Multiplexer 624 selects, in response to a supplied R/O select signal 623, the output of one of the random-value source 621 and the ordered-value source 622 to define the select signal 625. The R/O select signal 623 is user-programmable and modifiable on the fly, preferably on a once per frame basis. If desired, provisions can be made to modify the R/O select signal 623 more frequently, such as on a once per line basis. The system bus interface circuit 310 (FIG. 3) provides the programmable structure by which the R/O select signal 623 can be modified on the once per frame or other basis.

Figure 6B:
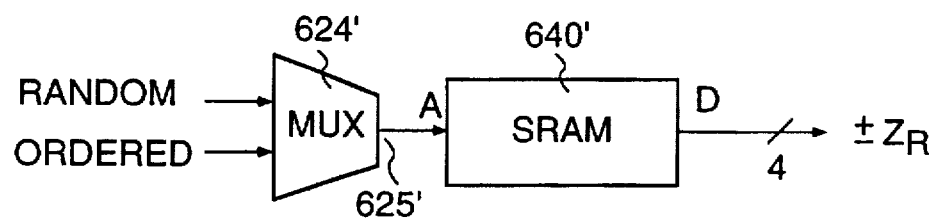
FIG. 6B shows an alternate way of forming the programmable dither circuit.

FIG. 6B shows an alternate embodiment for the combination of elements 623, 620 and 640. In the alternate embodiment, a multiplexer 624' supplies one or the other of the random or ordered series of values to the address (A) input of a programmable, static-type random access memory (SRAM) 640'. The data output (D) of SRAM 640' defines the dither signal ±$Z_R$.

The contents of the register file 640 (or SRAM 640') may be programmed as desired to provide various types of dither functions. By way of example, if all the cells of the file 640/640' are loaded with the same value, then the dither signal ±$Z_R$ will be constant for all clock cycles. A constant value of $Z_R$=0 is in effect, no dither. A constant value of $Z_R$=3 will provide round off prior to truncation.

On the other hand, if a series of different values is loaded into the file 640/640', and the ordered source 622 is selected by multiplexer 624, then the dither values ±$Z_R$ will reflect a sequential stepping-through through the series of values loaded into the file 640/640'.

The specific pattern of values that are to be loaded into file 640/640' may be determined empirically based on the type of image to be dithered. One general patterning method that has been found to produce eyepleasing dithering, is to assure an average dither value of zero over time for each screen pixel and a consistent statistical variation for each screen pixel. This can be done by initially loading the file 640/640' with a first set of both positive and negative values and by then inverting the polarity of these positive and negative values every frame or every 2 or more frames, so that positive values become negative and vice versa. Other patterns that provide a same over-time average dither value for each pixel position may also be used.

According to yet another option, the random source generator 621 is selected by multiplexer 624 and a pre-defined series of different values is loaded into the file 640/640'. In such a case, the series of dither values represented by signal ±$Z_R$ will randomly step through the values loaded in the file 640/640'. The statistics of the random walk-through will depend on the values loaded into the file 640/640' and their location in the file 640/640'. By way of example, some values may be loaded in more than once and accordingly they will skew the over-time distribution of values of the ±$Z_R$ signal. If a pseudo-random generator is used for source 621, it may have some statistical quirks of its own which favor some locations in file 640/640' over others. The minimum and maximums values of the ±$Z_R$ signal will correspond to those of the values loaded into the file 640/640' (e.g., −8 to +7, or −4 to +3 or 0 to +3, and so forth).

Accordingly, given the programmable dither circuit 600 of FIGS. 6A, 6B one can have a constant, or an ordered or a random dither function as desired at appropriate times. It has been found for example, that when a static image is presented having a solidly colored, dominant background such as a big blue sky, it is not desirable to use random dither because this appears as noise in what is expected to be a solid non-changing portion of the imagery. The ordered dither produces a more eye-pleasing picture. Of course, the opposite may be true for other kinds of imagery where, for example, animated objects are moving in front of other objects at rapid speed. The programmability of the dithering circuit gives programmers the ability to custom tailor the dither function according to the type of imagery being projected.

The circuit 600 of FIG. 6A (or alternative 6B) may be replicated three times to generate the respective 5-BPC values: R#, G# and B# of the dithered/reduced signal 384. In such an embodiment, the dither (or no-dither) function for each color field can be established independently of that of the others. In other words, the dithering section for each color component has its own independent adder 610, its own independent file 640/640', its own independent sequence-selecting multiplexer 624, its own independent R/O select signal 623, its own independent random noise generator 621, and its own independent ordered-number generator 622.

In an alternate embodiment that uses less die space, the $Z_R$-producing elements, 621, 622, 623, 620 and 640 are not replicated, but rather are shared. Only adder 610 is replicated three times, one instance for each color component (R, G, B). This sharing of the same dither value ±$Z_R$ simultaneously across the plural color components (R, G, B) has been found to not only save space on the integrated circuit, but also to produce the more eye-pleasing video effects.

The sixteenth bit of the dithered/BPC-reduced pixel signal 384 is a so-called "subposition" bit that is not related to the adaptor function of the FMV cartridge 300. This subposition bit (SP) is used further downstream, in an interpolator portion of the video output path 271 (FIG. 2)to optionally enhance the resultant visual output 280. A more detailed description of the subposition bit and interpolator may be found in the above-cited U.S. patent application Ser. No. 07/970,287. The FMV cartridge 300 merely sets an initial value for the subposition bit SP. This initial setting can be changed by the CPU 262 or other portions of the real-time data processing system 275 after the SP signal is next forwarded, as part of the dithered/BPC-reduced pixel signal 384, to the decompressed video region 254. Accordingly, the FMV cartridge 300 simply sets the more significant SP bit of each 16-bit wide pixel signal to zero.

Referring again to FIG. 3, the 16-bit wide, BPC-reduced/ dithered signal 384 is next transferred by a 16-bit wide parallel bus 385 to one of a set of first and second video storage buffers 391 and 392. Pixels belonging to odd-numbered video lines are transferred to first buffer 391 while pixels belonging to even-numbered video lines are transferred to second video buffer 392. This is done to conform with the split-bank architecture of memory system 250. The split-bank architecture is used to speed up interpolation as disclosed in the above-cited U.S. patent application Ser. No. 07/970,287. Data from odd and even lines is fetched simultaneously from system memory 250 so that interpolation can be performed without need for a line buffer.

At appropriate DMA time slots, the contents of the odd-lines video buffer 391 are transferred over by 16-bit wide bus 315 and through the system bus interface 310 to a corresponding "odd-lines" portion of decompressed video region 254. Similarly, the contents of the even-lines video buffer 392 are transferred at appropriate DMA time slots by way of a 16-bit wide bus 316 through interface 310 to a corresponding "even-lines" portion of the decompressed video region 254. Of course, if another high bandwidth memory architecture is used such as Synchronous-DRAM or RAMBUS, the output interface of the FMV cartridge 300 can be structured to suite the needs of such an alternative memory architecture.

Referring to FIG. 2, once the decompressed video data resides in video region 254, it can be manipulated in real time by the spryte rendering engines 263 and the PPMP 264 to impart a variety of geometry transformations and color-remappings (and resolution enhancements via the SP bit) to desired portions or all of the full motion video picture that is being passed through the decompressed video region 254. As a result, the threedimensional effects that have been described with regard to FIG. 1 can be applied in real time to a full motion video picture that has been compressed by MPEG or other compression techniques.

Numerous modifications and variations will become apparent to those skilled in the art after studying the above disclosure.

Given the above disclosure of general concepts and specific embodiments, the scope of protection sought is to be defined by the claims appended hereto.

What is claimed is:

1. A full motion video system comprising:

(a) decompressor means for decompressing a supplied pre-compressed digital representation of a moving image portion of a full motion picture, where the decompressor means outputs in real time, a decompressed first video signal having a first format, the decompressed first video signal being representative of at least a first moving image portion of the full motion picture; and (b) real-time processor means for receiving and digitally processing in real time, the first video signal or another video signal derived from the first video signal, said digital processing producing a transformed video signal representative of a transformed second moving image portion derived from the first moving image portion; wherein said real-time processor means includes:

(b.1) geometry transform means for geometrically transforming in real time the first moving image portion as represented by the decompressed first video signal or a derivative thereof to produce therefrom a geometrically transformed signal representative of the geometrically transformed first moving image portion.

2. A full motion video system according to claim 1 wherein said real-time processor means includes:

(b.2) interactive control means for responding in real time to user actuations; and (b.1a) wherein said geometry transform means is operatively coupled to the interactive control means for geometrically transforming in real time response to said user actuations, the first image as represented by the received first video signal or a derivative thereof and for thereby defining said transformed video signal.

3. A full motion video system according to claim 1 wherein (b.1a) said geometry transform means imparts in real time to the first moving image portion, one or more geometry transform operations including rotation.

4. A full motion video system according to claim 1 wherein said real-time processor means further includes:

(b.2) color-remapping means for remapping colors in the first moving image portion as represented by the decompressed first video signal or a derivative thereof and for thereby defining colors of the transformed video signal.

5. A full motion video system according to claim 4 wherein said color-remapping means re-maps colors within the first moving image portion by performing in real time, one or more color re-mapping operations selected from the group consisting of: interpolation, palette substitutions, and color blending.

6. A full motion video system according to claim 4 wherein said real-time processor means further includes:

(b.3) interactive control means for responding in real time to user actuations; and wherein said geometry transform means and color-remapping means are operatively coupled to the interactive control means for altering their respective geometry transform and color-remapping functions in real time response to user actuations of the interactive control means.

7. A full motion video system according to claim 1 wherein the processor means is configured to process image data having a second format, said second format being different from the first format; and said full motion video system further comprises:

(c) adaptor means, interposed between the decompressor means and the processor means, for converting the decompressed first video signal in real time into a second decompressed video signal having the second format, and for presenting the second decompressed video signal to the processor means, said second decompressed video signal being substantially representative of said first moving image portion of the full motion picture.

8. A full motion video system according to claim 7 wherein said real-time processor means includes:

(b.2) interactive control means for responding in real time to user actuations; and (b.1a) wherein said geometry transform means is operatively coupled to the interactive control means for geometrically transforming in real time response to said user actuations, the first image as represented by the received second video signal and for thereby defining a third video signal representative of the transformed image.

9. A full motion video system according to claim 7 wherein (b.1a) said geometry transform means includes skew means for imparting skew to the first moving image either once or recursively as the first moving image is transformed into said transformed image.

10. A full motion video system according to claim 7 wherein (b.1a) said geometry transform means includes scaling means for scaling the size of the first image either once or recursively as the first moving image is transformed into said transformed image.

11. A full motion video system according to claim 7 wherein said real time processor means includes (b.2) color modulation means for modulating colors of the first image either once or recursively as the first moving image is transformed into said transformed image, said modulating of colors occurring at least partially in real time response to indications by the interactive control means of user actuations.

12. A full motion video system according to claim 7 wherein the first format has a programmably-defined first arrangement of pixels per frame and the second format has a second arrangement of pixels per frame and the adaptor means is programmable to accommodate said programmably-defined first arrangement of pixels per frame.

13. A full motion video system according to claim 12 wherein:

the programmably-defined first arrangement of pixels per frame varies;

the second arrangement of pixels per frame is programmably-defined to vary in correspondence with variations of the first arrangement; and the adaptor means includes a programmable resampling means for producing, in response to variations of the first arrangement, the corresponding second arrangement of pixels per frame.

14. A full motion video system according to claim 13 wherein:

the programmably-defined first arrangement has either 352-by-240 or 352-by-288 pixels-per-frame and the corresponding second arrangement respectively has either 320 pixels-per-line or 384 pixels-per-line.

15. A full motion video system according to any one of claims 7, 9, 10, 12 and 13 wherein:

the second format has symmetric pixels each of equal height and width; and the first format has asymmetric pixels each having a width that is different from a respective height of the respective asymmetric pixel.

16. A full motion video system according to claim 7 wherein the first format has a predefined first number of pixels-per-line and the second format has a different second number of pixels-per-line.

17. A full motion video system according to claim 16 wherein the second number of pixels-per-line is programmably-defined and the adaptor means includes:

(c.1) programmable resampling means for producing, in response to a supplied programming signal, the second format with the corresponding second number of pixels-per-line.

18. A full motion video system according to claim 17 wherein said programmable resampling means includes:

(c.11) sequencer means responsive to said programming signal; and (c.12) weight and sum means, responsive to the sequencer means, for receiving a source signal representing sequential source pixels, for assigning respective weights to the source pixels, and for producing a weighted sum signal representing a sum of the respectively weighted source pixels.

19. A full motion video system according to claim 18 wherein said weight and sum means comprises:

(c.121) first multiples producing means, responsive to the sequencer means, for receiving the source signal and for producing a first multiple signal representing a sequencer-selected one of a constant and a first set of multiples of the sequential source pixels;

(c.122) second multiples producing means, responsive to the sequencer means, for receiving the source signal and for producing a second multiple signal representing a sequencer-selected one of a constant and a second set of multiples of the sequential source pixels; and (c.123) third multiples producing means, responsive to the sequencer means, for receiving the source signal and for producing a third multiple signal representing a sequencer-selected one of a constant and a third set of multiples of the sequential source pixels; and (c.124) summing means, operatively coupled to the first, second and third multiples producing means, for producing a summation signal representing a sum of the first through third multiple signals.

20. A full motion video system according to claim 19 wherein said weight and sum means further comprises:

(c.125) first register means, coupled to the summing means, for storing a first instance of the summation signal;

(c.126) second register means, coupled to the summing means, for storing a second instance of the summation signal; and (c.127) adding means, coupled to the first and second register means, for adding the first and second instances of the summation signal and thereby producing the weighted sum signal.

21. A full motion video system according to claim 18 wherein said programmable resampling means further includes:

(c.13) programmable divider means, operatively coupled to the weight and sum means, for producing a divided signal representing the value of the weighted sum signal divided by a programmably-defined divisor.

22. A full motion video system according to claim 21 wherein the programmably-defined divisor is approximately equal to a value selected from the group consisting of 10 and 12.

23. A full motion video system according to claim 21 wherein the programmably-defined divisor is a value, Y, defined by the equation:

$$1/Y = (W+1) \cdot (1/X) + (W+1) \cdot (1/(U \cdot X)),$$

where U, W and X are programmably-defined nonzero integers each equal to two raised to a positive power.

24. A full motion video system according to claim 23 wherein the integer W is programmably selected from the group consisting of 2 and 4 and the integer X is programmably selected from the group consisting of 32 and 64.

25. A full motion video system according to claim 23 wherein the programmable divider means comprises:

(c.131) first and second left shifting means, operatively coupled to receive the weighted sum signal and to produce therefrom respective first and second shifted sum signals representing the value of the weighted sum signal shifted left by a predefined first and second number of bit positions;

(c.132) first selector means for programmably selecting and outputting one of the first and second shifted sum signals, the output of said first selector means representing the value, S times W, where S is the value of the weighted sum signal;

(c.133) first addition means, operatively coupled to receive the output of the first selector means and to receive the weighted sum signal and to produce therefrom a first addition signal representing the value, S·(W+1);

(c.134) first right shifting means, operatively coupled to receive the first addition signal, for shifting the first addition signal right by a third predefined number of bit positions to produce therefrom a right-shifted first signal representing the value, S·(W+1)/U;

(c.135) second addition means, operatively coupled to receive the output of the first addition means and of the first right shifting means, to produce therefrom a second addition signal representing the value, S·(W+1)·(1+1/U);

(c.136) second and third right shifting means, operatively coupled to receive the second addition signal and to produce therefrom respective second and third right-shifted signals representing the value of the second addition signal shifted right respectively by a predefined fourth and fifth number of bit positions; and (c.137) second selector means for programmably selecting and outputting one of the second and third right-shifted signals, the output of said second selector means representing the value, S·(W+1)·(1+1/U)·(1/X).

26. A full motion video system according to claim 7 wherein the first format has a predefined first number of bits-per-pixel and the second format has a different second number of bits-per-pixel.

27. A full motion video system according to claim 26 wherein the second number of bits-per-pixel is smaller than the first number of bits-per-pixel and wherein the adaptor means includes:

(c.1) truncation means for removing excessive, less significant bits from a precursor signal having the first number of bits-per-pixel and thereby producing a BPP-reduced signal having the smaller second number of bits-per-pixel; and (c.2) pre-truncation dither means for adding a dither signal to a less significant portion of the precursor signal before the precursor signal is truncated by the truncation means.

28. A full motion video system according to claim 27 wherein the dither means comprises:

(c.21) adder means having a first input port for receiving the precursor signal, a second input port for receiving the dither signal, and an output port for outputting at least the non-truncated portion of the BPP-reduced signal; and (c.22) programmable storage means, coupled to the second input port of the adder means, for storing and supplying a series of predefined dither values to the second input port to thereby define the dither signal.

29. A full motion video system according to claim 28 wherein the dither means further comprises:

(c.23) programmable sequencer means, operatively coupled to the programmable storage means and responsive to a supplied sequence-defining signal, for sequencing through the dither values that are stored in the storage means in accordance with a sequence defined by the supplied sequence-defining signal.

30. A full motion video system according to claim 29 wherein the programmable sequencer means comprises:

(c.231) a first signal generator for generating a first addressing signal representing a relatively random series of addresses;

(c.232) a second signal generator for generating a second addressing signal representing a non-random, ordered series of addresses; and (c.233) selection means, responsive to the sequence-defining signal and operatively coupled to the first and second signal generators, for selecting one of the first and second addressing signals as a storage addressing signal that defines said sequencing through the dither values stored in the storage means.

31. A full motion video system according to claim 27 wherein:

the first format has a plurality of first color components each having a first number of bits-per-component;

the second format has a plurality of second color components each having a second, smaller number of bits-per-component;

the truncation means comprises a plurality of independent truncating sections each corresponding to a respective one of the plural second color components, each truncating section removing excessive, less significant bits from a corresponding color component of the precursor signal to thereby produce the BPP-reduced signal with the smaller second number of bits-per-component; and the dither means comprises a plurality of independent dithering sections each corresponding to a respective one of the plural second color components and coupled to a respective one of the truncating sections, each dithering section adding a respective, component-dither signal to a less significant portion of the corresponding color component in the precursor signal before the precursor component is truncated by a corresponding one of the truncating sections.

32. A full motion video system according to claim 31 wherein:

the first format has at least three first color components each having at least eight bits-per-component;

the second format has a corresponding at least three second color components each having less than eight bits-per-component; and the respective component-dither signal of each dithering section has a number of bits at least equal to the difference in number of bits per component between the corresponding first and second color components.

33. A full motion video system according to claim 31 wherein:

each of the independent dithering sections includes a respectively independent, adder means having a first input port for receiving the corresponding color component of the precursor signal, a second input port for receiving the corresponding component dither signal, and an output port for outputting at least the non-truncated portion of the corresponding color component in the BPP-reduced signal; and each of the independent dithering sections further includes a respectively independent, programmable storage means, coupled to the second input port of the corresponding adder means, for storing and supplying a series of predefined dither values to the corresponding second input port to thereby independently define the corresponding component dither signal.

34. A full motion video system according to claim 33 wherein:

each of the independent dithering sections additionally includes a respectively independent, programmable sequencer means, operatively coupled to the corresponding programmable storage means and responsive to a correspondingly supplied, component sequence-defining signal, for sequencing through the dither values that are stored in the corresponding storage means in accordance with a sequence defined by the correspondingly supplied, component sequence-defining signal.

35. A full motion video system according to claim 7 wherein the first format has a predefined first number of bits-per-pixel and the decompressed first video signal uses a first quantization range that is less than the maximum quantization range possible with said first number of bits-per-pixel, the unused portion or portions of the first quantization range defining a corresponding one or more dead spaces, and further wherein the adaptor means comprises:

(c.1) range expansion means for receiving the decompressed first video signal and producing therefrom a range-expanded signal that uses a second quantization range that is wider than the first quantization range.

36. A full motion video system according to claim 35 wherein the range expansion means performs range expansion so as to approximately satisfy the following expansion formula:

$$R' = (R-L) \cdot (U'-L'+1)/(U-L+1)$$

where R represents a component value of the decompressed first video signal, R' represents the corresponding expanded component value, L represents a predefined lower bound of the range-limited R value, U represents a predefined upper bound of the range-limited R value, L' represents a predefined lower bound of the expanded R' value, and U' represents a predefined upper bound of the expanded R' value.

37. A full motion video system according to claim 36 wherein the range expansion means includes approximate multiplying means for multiplying a difference signal D representing (R-L) by an approximation of the multiplying factor, (U'-L'+1)/(U-L+1), said approximation being equal to a sum of three or less terms, each term being equal to an integer multiple of the value 2 raised to an integer power.

38. A full motion video system according to claim 36 wherein the range expansion means includes approximate multiplying means for multiplying a difference signal representing D=(R-L) by an approximation of the multiplying factor, (U'-L'+1)/(U-L+1), said approximate multiplying means comprising:

(c.1) first left-shifting means for receiving the difference signal and producing therefrom a first left-shifted difference signal representing D multiplied by 2 raised to a first predefined power, the first predefined power being a positive first integer;

(c.2) first adder means having a first input for receiving the difference signal and a second input for receiving the first left-shifted difference signal, said first adder means producing a first sum signal representing the sum of the difference signal and the first left-shifted difference signal;

(c.3) second left-shifting means for receiving the first sum signal and producing therefrom a second left-shifted difference signal representing the value of the first sum signal multiplied by 2 raised to a second predefined power, the second predefined power being a positive second integer;

(c.4) second adder means having a first input for receiving the difference signal and a second input for receiving the second left-shifted difference signal, said second adder means producing a second sum signal representing the sum of the difference signal and the second left-shifted difference signal.

39. A full motion video system according to claim 36 wherein the approximate multiplying means further comprises:

(c.5) right-shifting means for receiving the second sum signal and producing therefrom a justified signal representing the value of the second sum signal multiplied by 2 raised to a second predefined power, the second predefined power being a negative third integer.

40. A full motion video system according to claim 1 wherein the first format has a predefined first number of bits-per-pixel, the decompressed first video signal uses a first quantization range that is less than the maximum quantization range possible with said first number of bits-per-pixel, the unused portion or portions of the first quantization range defining a corresponding one or more dead spaces, the color of each pixel of the pre-compressed digital representation is defined in a first color space, the color of each pixel of the decompressed first video signal is defined in a different second color space, and further wherein the decompressor means comprises:

(a.1) color space conversion means for converting color signals representing colors according to coordinates of the first color space into converted color signals representing colors according to coordinates of the second color space in accordance with the following linear transformation, $$\begin{bmatrix} R \\ G \\ B \end{bmatrix} = g \cdot \begin{bmatrix} \cdots \\ \cdots \\ \cdots \end{bmatrix} \cdot \begin{bmatrix} Y - \text{off} \\ C_R \\ C_B \end{bmatrix} \quad \{\text{Eq. 5b}\}$$

wherein R, G, and B are coordinate values of the second color space, Y, $C_R$ and $C_B$ are coordinate values of the first color space, g is a gain factor that is appropriately set to eliminate or reduce an upper dead space of the first quantization range, and off is an offset factor that may be set to zero or appropriately set to eliminate or reduce a lower dead space of the first quantization range.

41. A full motion video system according to claim 1 wherein the pre-compressed digital representation is stored on a disk and said system further comprises:

(c) a disk playback mechanism, operatively coupled to the decompressor means, for reproducing the pre-compressed digital representation on a real time basis and supplying the reproduced digital representation to the decompressor means for real time decompression and subsequent geometric transformation by said geometry transform means.

42. A full motion video system according to claim 41 wherein the disk includes optical data storage areas and the disk playback mechanism includes optical playback means for detecting data optically stored on the optical data storage areas and for reproducing such optically stored data.

43. A full motion video system according to claim 41 wherein the disk stores both compressed video and audio portions of a full motion picture and the decompressor means outputs in real time, a decompressed audio signal representative of the audio portion of the full motion picture.

44. A full motion video system according to claim 1 wherein:

(a.1) the decompressor means is further for decompressing a pre-compressed digital representation of a audio portion of a full motion picture, and where the decompressor means outputs in real time, a decompressed audio signal representative of at least a first audio portion of the full motion picture; and (b.1) the real-time processor means is further for digitally processing in real time, the first audio portion represented by the decompressed audio signal to produce therefrom a transformed audio signal representative of a transformed audio portion derived from the first audio portion.

45. A full motion video system according to claim 3 wherein:

(b.1b) said geometry transform operations further include skewing.

46. A full motion video system according to claim 45 wherein:

(b.1c) said geometry transform operations further include size rescaling.

47. A full motion video system according to claim 3 wherein:

(b.1b) said geometry transform means imparts the one or more geometry transform operations recursively in real time.

48. A full motion video system according to claim 16 wherein the ratio between said first number of pixels-per-line and said second number of pixels-per-line is not a power of two.

49. A full motion video system according to claim 16 wherein said first number of pixels-per-line is at least 352.

50. A full motion video system according to claim 40 wherein said offset factor is set to a value other than zero so as to eliminate or reduce a lower dead space of the first quantization range.

51. A full motion video system according to claim 44 wherein said real-time processor means includes:

(b.1a) sound processing means for processing said decompressed audio signal to create an impression of a sound source that is moving through 3-dimensional space.

52. A machine-implemented method for producing a real-time-manipulated full motion picture comprising the steps of:

(a) retrieving from a compact disk or another storage means which has a compressed full-motion picture stored therein, compressed data representing video and audio of at least a portion of the full-motion picture;

(b) decompressing the retrieved data;

(c) transmitting the decompressed data in real-time to a real-time data processing system for real-time manipulation;

(c') performing said real-time manipulation on the transmitted data; and (d) outputting the real-time manipulated data for appreciation by a human recipient;

wherein said step of performing the real-time manipulation includes:

geometrically transforming in real-time the video portion of the transmitted data so as to produce a geometrically transformed version of the transmitted video portion.

53. A production method according to claim 52 wherein:

(c.1) the real-time manipulation includes imparting threedimensional effects in real time to the decompressed audio portion of the transmitted data so as to produce a transformed version of the audio portion of the transmitted data.

54. A production method according to claim 52 wherein the video portion of the decompressed data includes video data having a first format, the real-time data processing system is structured to manipulate video data having a different second format, and said method further comprises, before the step of transmitting the decompressed data to the real-time data processing system, the additional step of:

(e) converting the format of the decompressed video data in real time from said first format to said second format.

55. A production method according to claim 54 wherein the first format has a first arrangement of pixels per frame, the second format has a programmably-defined second arrangement of pixels per frame, and said step of converting includes:

(e.1) automatically determining what programmably-defined arrangement of pixels per frame is being employed in the second format; and (e.2) in response to said determination, automatically converting the video data from said first arrangement of pixels per frame said second arrangement of pixels per frame.

56. A production method according to claim 55 wherein the first arrangement of pixels per frame uses a first number of pixels per image line, the second arrangement of pixels per frame uses a different second number of pixels per image line, said step of responsively converting in real time includes:

(e.2a) resampling each image line of the decompressed video data in real time and thereby changing the number pixels per image line from said first number to said second number.

57. A production method according to claim 54 wherein the first format uses a first number of bits-per-pixel and the second format uses a smaller second number of bits-per-pixel, and said step of converting includes:

(e.1) reducing the number of bits-per-pixel from said first number to said smaller second number.

58. A production method according to claim 57 wherein said step of reducing includes:

(e.1a) adding a dither signal to the decompressed video data.

59. A production method according to claim 58 wherein said step of adding a dither signal includes:

(e.1b) programmably selecting the dither signal from the group consisting of a random dither signal and an ordered-sequence dither signal.

60. A production method according to claim 54 wherein the wherein the first format has a predefined first number of bits-per-pixel and the decompressed video signal uses a first quantization range that is less than the maximum quantization range possible with said first number of bits-per-pixel, the unused portion or portions of the first quantization range defining a corresponding one or more dead spaces, and said step of converting includes:

(e.1) expanding the quantization range so as to reduce or eliminate one or more of the dead spaces.

61. A production method according to claim 52 wherein said step of geometrically transforming includes at least one of:

(c'.1) rotating the video portion of the transmitted data, and (c'.2) skewing the video portion of the transmitted data.

62. A production method according to claim 61 wherein said step of geometrically transforming further includes:

(c'.3) size-rescaling the video portion of the transmitted data.

63. A production method according to claim 62 wherein said step of geometrically transforming further includes:

(c'.4) recursively performing at least one of said steps of rotating, skewing and size-rescaling.

64. A production method according to claim 62 wherein said step of performing the real-time manipulation further includes:

(c'.4) performing real time color re-mapping on the video portion of the transmitted data.

65. A dithering circuit comprising:

(a) adder means having a first input port for receiving a precursor signal, a second input port for receiving a dithering signal, and an output port for outputting a dithered signal;

(b) programmable storage means, coupled to the second input port of the adder means, for storing and supplying a series of predefined dither values to the second input port to thereby define the dithering signal; and (c) programmable sequencer means, operatively coupled to the programmable storage means and responsive to a supplied sequence-defining signal, for sequencing through the dither values that are stored in the storage means in accordance with a sequence defined by the supplied sequence-defining signal.

66. A circuit for generating signals representing weighted sums of digital input values represented by an input digital signal, said circuit comprising:

(a) first multiplexer means, coupled to receive the input digital signal and/or shifted derivatives of the input digital signal, for selectively outputting either a predefined first constant-value signal or a received one of the input digital signal and its shifted derivatives;

(b) second multiplexer means, coupled to receive the input digital signal and/or shifted derivatives of the input digital signal, for selectively outputting either a predefined second constant-value signal or a received one of the input digital signal and its shifted derivatives;

(c) first summing means for receiving the outputs of the first and second multiplexer means and for producing a first sum signal representing a sum of the outputs of the first and second multiplexer means;

(d) selection control means, operatively coupled to the first and second multiplexer means, for selecting the signal output by each of the first and second multiplexer means and thereby defining a weight to be applied to the input digital signal; and (e) second summing means for receiving first and second outputs of the first summing means and producing therefrom a second sum signal.

67. A range-expansion circuit for receiving an input digital signal having a first number of bits but representing a set of values having a first quantization range whose extent is less than two raised to a power equal to said first number, where the difference between the first quantization range and two raised to said power defines both upper and lower deadspaces about the first quantization range, said range-expansion circuit comprising:

(a) subtraction means for subtracting from said input digital signal an offset value representing all or part of the lower deadspace and for producing therefrom an offset digital signal; and (b) multiplying means for multiplying the offset digital signal by a gain factor to produce therefrom an expanded range signal having a second quantization range whose extent is larger than that of the first quantization range.

68. A moving picture system comprising:

(a) a real-time decompressor for decompressing a pre-compressed digital representation of an image portion of a moving picture, where the pre-compressed digital representation is supplied in real-time and the decompressor responsively outputs in real-time a decompressed first video signal representative of at least a first moving image portion of the moving picture;

(b) a reprogrammable memory, operatively coupled to the decompressor, for receiving and storing a second video signal, said second video signal being derived from the decompressed first video signal and being also representative of the at least first moving image portion of the moving picture; and (c) a real-time image transformer operatively coupled to said memory for accessing the second video signal stored therein and for transforming the second video signal in real-time to thereby produce a transformed video signal representative of a transformed version of said at least first moving image portion of the moving picture;

wherein said real-time image transformer includes:

(c.1) geometry transform means for geometrically transforming in real time the first moving image portion as represented by the stored second video signal or a derivative thereof to produce therefrom a geometrically transformed signal representative of the transformed version of the first moving image portion.

69. A moving picture system according to claim 68 further comprising:

(d) video output means for receiving the transformed video signal and outputting in real-time to a display means, a third video signal derived from said transformed video signal.

70. A moving picture system according to claim 68 wherein (c.1a) said geometry transform means imparts in real time to the first moving image portion as represented by the second video signal or a derivative thereof, one or more geometry transform operations including rotation.

71. A moving picture system according to claim 70 wherein
  (c.1b) said geometry transform operations further include skewing.

72. A moving picture system according to claim 71 wherein
  (c.1c) said geometry transform operations further include size rescaling.

73. A moving picture system according to claim 68 wherein
  (c.2) said real-time image transformer returns the transformed video signal to the reprogrammable memory for storage in said memory such that the transformed video signal may be recursively transformed by the real-time image transformer.

* * * * *